(12) United States Patent
Homma et al.

(10) Patent No.: US 11,314,664 B2
(45) Date of Patent: Apr. 26, 2022

(54) MEMORY ACCESS DEVICE, IMAGE PROCESSING DEVICE AND IMAGING DEVICE

(71) Applicant: OLYMPUS CORPORATION, Hachioji (JP)

(72) Inventors: Shinsuke Homma, Yokohama (JP); Kazue Chida, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 265 days.

(21) Appl. No.: 16/796,071

(22) Filed: Feb. 20, 2020

(65) Prior Publication Data

US 2020/0192830 A1    Jun. 18, 2020

Related U.S. Application Data

(63) Continuation of application No. PCT/JP2017/031110, filed on Aug. 30, 2017.

(51) Int. Cl.
*G06F 13/16* (2006.01)
*G06F 9/48* (2006.01)
*G06F 13/374* (2006.01)

(52) U.S. Cl.
CPC ........ *G06F 13/1626* (2013.01); *G06F 9/4837* (2013.01); *G06F 13/374* (2013.01)

(58) Field of Classification Search
CPC .. G06F 13/1626; G06F 13/374; G06F 9/4837; G06F 12/00; G06F 13/00
See application file for complete search history.

(56) References Cited

U.S. PATENT DOCUMENTS

| | | | | |
|---|---|---|---|---|
| 2001/0010066 A1* | 7/2001 | Chin | ................. | G06F 13/1605 711/108 |
| 2002/0144052 A1* | 10/2002 | Yada | .................... | G06F 13/387 711/103 |

(Continued)

FOREIGN PATENT DOCUMENTS

| | | | |
|---|---|---|---|
| JP | 2000-148668 A | 5/2000 | |
| JP | 2007-280253 A | 10/2007 | |
| JP | 2012-199788 A | 10/2012 | |

OTHER PUBLICATIONS

International Search Report dated Nov. 14, 2017, issued in counterpart International Application No. PCT/JP2017/031110, w/English translation (2 pages).

*Primary Examiner* — Tuan V Thai
(74) *Attorney, Agent, or Firm* — WHDA, LLP

(57) ABSTRACT

A memory access device includes: a data processor configured to output an access request requesting access to a memory connected to a data bus, perform a data processing on data in the accessed memory, and provide notification of a progress status of the data processing; a priority switching control part configured to determine an urgency of the data processing by the data processor according to the progress status of the data processing notified from the data processor, and output a priority switching signal notifying switching of a priority of the data processor; and a bus arbiter connected to the data bus, configured to change the priority of the data processor according to the priority switching signal to arbitrate the access request output from the data processor, and control access to the memory according to the access request that has been arbitrated.

9 Claims, 9 Drawing Sheets

(56) References Cited

U.S. PATENT DOCUMENTS

2005/0021883 A1* 1/2005 Shishizuka ........ H04N 1/32358
 710/20
2015/0234747 A1* 8/2015 Tanaka ................ G06F 12/0875
 711/125

* cited by examiner

MEMORY ACCESS DEVICE, IMAGE PROCESSING DEVICE AND IMAGING DEVICE

CROSS REFERENCE TO RELATED APPLICATIONS

This application is a continuation application based on a PCT Patent Application No. PCT/JP2017/031110, filed on Aug. 30, 2017, the content of which is incorporated herein by reference.

BACKGROUND

Technical Field

The present invention relates to a memory access device, an image processing device, and an imaging device.

Background Art

In an imaging device such as a still image camera, a video camera, a medical endoscopic camera, or an industrial endoscopic camera, various image processing is performed by an image processing device such as a mounted system LSI. The image processing device includes a plurality of processing blocks for performing various image processing in the imaging device, and each processing block is connected to a data bus provided in the image processing device. In the image processing device, each processing block connected to the data bus shares one DRAM (Dynamic Random Access Memory) connected to the outside of the image processing device as a bus master. In the image processing device, each processing block (bus master) accesses the DRAM by DMA (Direct Memory Access) transfer via the data bus, and passes various data for image processing via are transferred via the DRAM.

An image processing device configured to share a single DRAM among a plurality of processing blocks (bus masters) includes an arbitration circuit (so-called DMA arbitration circuit) that arbitrates DMA transfer access requests output from the respective bus masters. The arbitration circuit controls actual access to the DRAM while appropriately arbitrating access requests (so-called DMA requests) to the DRAM output from the respective bus masters. The arbitration circuit basically determines a bus master that accepts (permits) an access request to the DRAM based on a priority that represents the priority of each bus master. Thereby, in the image processing device, the flow of data in the data bus when each bus master transfers data with the DRAM, that is, a bus bandwidth is secured, and a function as an entire system of the imaging device equipped with the image processing device is realized.

In recent years, the performance of imaging devices has been improved. For this reason, also in the image processing device mounted on the imaging device, the number of processing blocks (bus masters) provided increases, and the processing performed in each processing block has become complicated. For example, in recent image processing devices, as the display device for displaying captured images has become higher definition, an image having a resolution of a full HD size (1920×1080) compatible with HDTV (High Definition TeleVision) and an image having a resolution of 4K size (3840×2160) compatible with UHDTV (Ultra High Definition TeleVision) can be displayed. For this reason, in the image processing device, the amount of data transferred via the data bus also increases, and the bus bandwidth (data access amount per unit time) required for each processing block (bus master) to access the DRAM via the data bus is increasing rapidly.

When the arbitration circuit performs arbitration based on the priority in a state where the amount of access to the DRAM is large and the data bus is congested, that is, in a state where the bus bandwidth is high, arbitration can be performed so as to reliably accept (permit) an access request from a processing block (bus master) with a high priority, but it is conceivable that access requests from processing blocks (bus masters) with a lower priority will be less accepted (permitted). That is, a processing block (bus master) having a low priority cannot transfer necessary data to and from the DRAM because the access request to the DRAM is not accepted (not permitted), and it is conceivable that the processing cannot be completed within the specified processing time. However, even in a state in which the processing block (bus master) has a low priority, when the processing is not completed within a predetermined processing time, the operation or function of the imaging device equipped with the image processing device as a system may fail.

Thus, for example, a technology of a bus arbitration system as disclosed in Japanese Unexamined Patent Application, First Publication No. 2000-148668 (hereinafter referred to as Patent Document 1) is disclosed. In Patent Document 1, in a case in which a bus request from a bus master that is highly necessary to perform real-time processing conflicts with a bus request from another bus master, when it is determined that an access in the bus master that requires real-time processing is awaited, there has been proposed a bus arbitration system that preferentially gives a shared bus usage right to a bus master that requires real-time processing. At this time, in the bus arbitration system disclosed in Patent Document 1, before actually giving the right to use the shared bus to any bus master, based on the maximum time that each bus master can wait and the estimated occupation time of the shared bus in each bus master, after verifying the influence on the other bus master when the right to use the shared bus is given to one candidate bus master, the bus master that actually gives the right to use the shared bus is determined. Thereby, in the bus arbitration system disclosed in Patent Document 1, bus arbitration can be performed so that processing by the bus master that requires real-time processing is not delayed, that is, the waiting time in the bus master is not exceeded.

As described above, in the technique disclosed in Patent Document 1, when bus requests from a plurality of bus masters compete, before any bus master is actually given a right to use the shared bus, it is determined which bus master is actually given the right to use the shared bus. Here, each processing block (bus master) outputs an access request in accordance with the state of the processing performed by itself. For this reason, access requests from the respective processing blocks (bus masters) are not always output at the same time. Also, the cycle at which each processing block (bus master) outputs an access request is not always the same cycle. In the technique disclosed in Patent Document 1, no consideration is given to the timing at which a bus request is output from the bus master. For this reason, in the technique disclosed in Patent Document 1, although bus arbitration can be performed with respect to bus requests from a plurality of bus masters output at the same time, bus arbitration cannot be performed including the bus request output after the right to use the shared bus is given. For this reason, with the technique disclosed in Patent Document 1, it is not always possible to perform bus arbitration without exceeding the waiting time in the bus master, and the operation or function of the system may fail.

In a memory access device, an image processing device, and an imaging device according to the present invention, in a state in which a plurality of processing blocks share a DRAM, even when the processing block has a low priority, the processing is performed within a predetermined processing time, and it is possible to reduce the cause of the system failure.

SUMMARY

A memory access device includes: a data processor configured to output an access request requesting access to a memory connected to a data bus, perform a data processing on data in the accessed memory, and provide notification of a progress status of the data processing; a priority switching control part configured to determine an urgency of the data processing by the data processor according to the progress status of the data processing notified from the data processor, and output a priority switching signal notifying switching of a priority of the data processor; and a bus arbiter connected to the data bus, configured to change the priority of the data processor according to the priority switching signal to arbitrate the access request output from the data processor, and control access to the memory according to the access request that has been arbitrated.

The priority switching control part may be configured to calculate a remaining processing time in the data processing performed by the data processor, according to the progress status of the data processing notified from the data processor, to calculate a processing margin time when the data processor performs the data processing, according to the remaining processing time, a limit time defined as a time that the data processor needs to complete the data processing, and a processing time from a start of the data processing by the data processor to the present, and to determine the urgency of the data processing by the data processor, according to the processing margin time and a predetermined urgency threshold time.

In the memory access device, the priority switching control part may be configured, when the processing margin time is shorter than the predetermined urgency threshold time, to determine that the urgency of the data processing by the data processor is high, and to output the priority switching signal notifying that the priority of the data processor is to be increased, and when the processing margin time is not shorter than the urgency threshold time, to determine that the urgency of the data processing by the data processor is low, and to output the priority switching signal notifying that the priority of the data processor remains low, and the bus arbiter may be configured to arbitrate the access request output from the data processor by increasing the priority of the data processor notified to increase the priority by the priority switching signal.

In the memory access device, the data processor may be configured to notify a processing completion rate indicating a rate of completion of the data processing as the progress status of the data processing, and the priority switching control part may be configured to calculate the remaining processing time according to a data processing speed and processing amount in the data processor and the notified processing completion rate.

In the memory access device, the data processor may be configured to notify a processing completion number indicating the number of times that the data processing is completed as the progress status of the data processing in a case of performing the data processing in multiple times, and the priority switching control part may be configured to calculate the remaining processing time according to a remaining number of processing acquired from the number of times of the data processing performed by the data processor separately and the notified processing completion number, an amount of processing in one data processing performed separately, and a speed of the data processing in the data processor.

In the memory access device, the data processor may be configured to notify a processing completion amount indicating an amount of processing for which the data processing has been completed up to a current time, as the progress status of the data processing, in a case of performing the data processing divided into multiple times with different processing amounts, and the priority switching control part may be configured to calculate the remaining processing time, according to an amount of remaining processing acquired from a total amount of processing in the data processing performed by the data processor and the notified processing completion amount, and a speed of the data processing in the data processor.

In the memory access device, the priority switching control part may be configured to calculate the processing margin time after multiplying one or both of the remaining processing time and the limit time by a predetermined time coefficient expressed as a ratio to time.

The memory access device may further include: a plurality of the data processors that are configured to sequentially perform a corresponding data processing in a series of processing in a predetermined order, wherein each of the data processors may be configured to start a corresponding data processing included in the next series of processing after the corresponding data processing included in the series of processes started first is completed, so that the plurality of data processors perform the corresponding data processing included in different series of processing in parallel, and the priority switching control part may be configured to determine the urgency of the data processing by each of the data processors in units of the series of processing, according to the progress status of the data processing notified from each of the data processors, and, when it is determined that the urgency of the data processing in the plurality of data processors is high, to output the priority switching signal notifying to increase the priority of the data processor that performs the corresponding data processing included in the series of processes started earlier.

The memory access device may further include: a plurality of the data processors that are configured to sequentially perform a corresponding data processing in a series of processing in a predetermined order, wherein each of the data processors is configured to start the corresponding data processing included in the next series of processing after the corresponding data processing included in the series of processing started earlier is completed, so as to perform the corresponding data processing included in the series of processing in which the plurality of data processors are different from each other in parallel, and the priority switching control part may be configured to calculate the processing margin time for each of the data processors, according to the remaining processing time for each of the data processors calculated according to the progress status of the data processing notified from each of the data processors, the limit time set for each of the data processors in each of the series of processes, and the processing time for each of the data processors, to determine the urgency of the data processing for each of the data processors, according to the processing margin time for each of the data processors and the urgency threshold time, and to output the priority switching signal notifying that the priority is increased so that completion of the data processing by the data processor that performs the data processing corresponding to the last of each series of processing does not exceed the set limit time.

An image processing device includes a memory access device that includes: a data processor configured to output an access request requesting access to a memory connected to a data bus, perform a data processing on data in the accessed memory, and provide notification of a progress status of the data processing; a priority switching control part configured to determine an urgency of the data processing by the data processor according to the progress status of the data processing notified from the data processor, and output a priority switching signal notifying switching of a priority of the data processor; and a bus arbiter connected to the data bus, configured to change the priority of the data processor according to the priority switching signal to arbitrate the access request output from the data processor, and control access to the memory according to the access request that has been arbitrated, wherein the priority switching control part is configured to calculate a remaining processing time in the data processing performed by the data processor, according to the progress status of the data processing notified from the data processor, to calculate a processing margin time when the data processor performs the data processing, according to the remaining processing time, a limit time defined as a time that the data processor needs to complete the data processing, and a processing time from a start of the data processing by the data processor to the present, and to determine the urgency of the data processing by the data processor, according to the processing margin time and a predetermined urgency threshold time.

An imaging device includes an image processing device that includes a memory access device, wherein the memory access device includes: a data processor configured to output an access request requesting access to a memory connected to a data bus, perform a data processing on data in the accessed memory, and provide notification of a progress status of the data processing; a priority switching control part configured to determine an urgency of the data processing by the data processor according to the progress status of the data processing notified from the data processor, and output a priority switching signal notifying switching of a priority of the data processor; and a bus arbiter connected to the data bus, configured to change the priority of the data processor according to the priority switching signal to arbitrate the access request output from the data processor, and control access to the memory according to the access request that has been arbitrated, wherein the priority switching control part is configured to calculate a remaining processing time in the data processing performed by the data processor, according to the progress status of the data processing notified from the data processor, to calculate a processing margin time when the data processor performs the data processing, according to the remaining processing time, a limit time defined as a time that the data processor needs to complete the data processing, and a processing time from a start of the data processing by the data processor to the present, and to determine the urgency of the data processing by the data processor, according to the processing margin time and a predetermined urgency threshold time.

According to each of the above aspects, in a case where a plurality of processing blocks share a DRAM, even in a processing block having a low priority, it is possible to provide a memory access device, an image processing device, and an imaging device capable of terminating processing within a predetermined processing time and reducing factors that cause a system failure.

DETAILED DESCRIPTION OF THE PREFERRED EMBODIMENTS

First Embodiment

Hereinafter, embodiments of the present invention will be described with reference to the drawings. In the following description, a case will be described in which the memory access device according to the first embodiment of the present invention is provided in an image processing device mounted on an imaging device such as a still image camera or a video camera.

Figure 1:
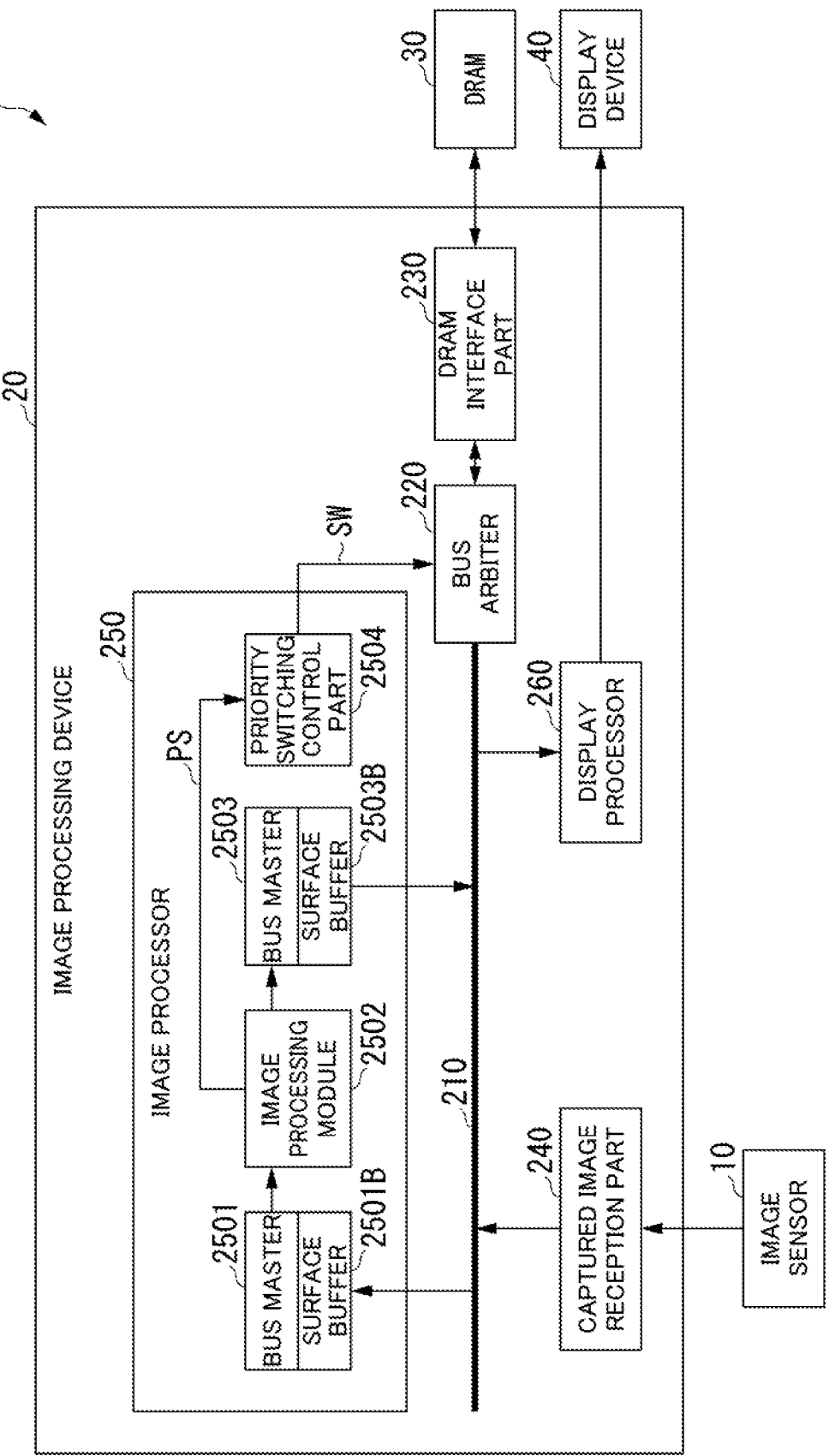
FIG. 1 is a block diagram showing a schematic configuration of an imaging device equipped with an image processing device including a memory access device according to a first embodiment of the present invention.

FIG. 1 is a block diagram showing a schematic configuration of an imaging device equipped with an image processing device including a memory access device according to the first embodiment of the present invention. The imaging device 1 shown in FIG. 1 includes an image sensor 10, an image processing device 20, a DRAM (Dynamic Random Access Memory) 30, and a display device 40.

Further, the image processing device 20 includes a bus arbiter 220, a DRAM interface part 230, a captured image reception part 240, an image processor 250, and a display processor 260. The image processor 250 includes a bus master 2501, an image processing module 2502, a bus master 2503, and a priority switching control part 2504. The bus master 2501 includes a surface buffer 2501B. The bus master 2503 includes a surface buffer 2503B. In the image processing device 20, the bus arbiter 220, the captured image reception part 240, the image processor 250, and the display processor 260 are connected to a common data bus 210.

In the imaging device 1 shown in FIG. 1, the image processor 250 provided in the image processing device 20 and the bus arbiter 220 constitute the memory access device according to the first embodiment.

The imaging device 1 captures a still image or a video image of a subject using the image sensor 10. Then, the imaging device 1 causes the display device 40 to display a display image corresponding to the captured still image. Further, the imaging device 1 causes the display device 40 to display a display image corresponding to the captured video image. The imaging device 1 can also record a record image corresponding to the captured still image or video image on a recording medium (not shown).

The image sensor 10 is a solid-state imaging device that photoelectrically converts an optical image of a subject formed by a lens (not shown) provided in the imaging device 1. For example, the image sensor 10 is a solid-state imaging device typified by a CCD (Charge Coupled Device) image sensor or a CMOS (Complementary Metal-Oxide Semiconductor) image sensor. The image sensor 10 outputs a pixel signal corresponding to the captured optical image of the subject to the captured image reception part 240 provided in the image processing device 20.

The DRAM 30 is a memory (data storage) that stores various data processed by the image processing device 20 provided in the imaging device 1. The DRAM 30 is connected to the data bus 210 via the DRAM interface part 230 and the bus arbiter 220 provided in the image processing device 20. The DRAM 30 stores image data of each processing stage in the image processing device 20. For example, the DRAM 30 stores pixel data output from the captured image reception part 240 based on the pixel signal output from the image sensor 10. For example, the DRAM 30 stores data of images (still images, video images, display images, record images, etc.) generated by the image processor 250 provided in the image processing device 20.

The display device 40 is a display device that displays a display image output from the display processor 260 provided in the image processing device 20. The display device 40 includes various display devices having different display image sizes, that is, the number of pixels is different. For example, in the display device 40, there is a small display device that is mounted on the imaging device 1 and operates as a viewfinder for confirming a subject to be photographed, such as a TFT (Thin Film Transistor) liquid crystal display (LCD) that displays an image of a VGA (640×480) size, or an EVF (Electronic View Finder). In addition, for example, as the display device 40, there is a large display device having a configuration detachable from the imaging device 1 and displaying and confirming a display image corresponding to a still image or a video image, such as an HDTV (High Definition TeleVision) that displays an image of full HD (1920×1080) size, or an UHDTV (Ultra High Definition TeleVision) that displays an image of 4K2K (3840×2160) size.

The image processing device 20 performs predetermined image processing on the pixel signal output from the image sensor 10 to generate a still image or a video image. Further, the image processing device 20 generates a display image corresponding to the generated still image or video image. Then, the image processing device 20 causes the display device 40 to display the generated display image. Further, the image processing device 20 can generate a record image corresponding to the generated still image or video image, and can record the generated record image on a recording medium (not shown).

In the image processing device 20, each of the captured image reception part 240, the image processor 250, and the display processor 260 is a processing block that realizes a processing function of image processing performed in the image processing device 20. In the image processing device 20, each of the captured image reception part 240, the image processor 250, and the display processor 260 accesses the DRAM 30 by DMA (Direct Memory Access) transfer via the data bus 210.

In the image processing device 20, each processing block is set with a priority indicating a priority order when accessing the DRAM 30 when executing image processing, that is, a priority order when performing DMA transfer. This priority is set for each operation performed by the imaging device 1, so-called an operation mode. For example, when the operation mode of the imaging device 1 is a shooting mode for shooting a subject, real-time performance is required for shooting of the subject and displaying a display image for confirming the subject to be shot, so-called a live view image (through image). Here, when a DMA transfer in which a processing block for realizing a function requiring real-time performance in the image processing device 20 accesses the DRAM 30 is awaited, the operation of the imaging device 1 as a system is broken. For this reason, in the image processing device 20, the priority of the processing block for realizing the function requiring real-time performance is set to be high so that DMA transfer of the processing block having a high priority is not waited. For example, when the operation mode of the imaging device 1 is the shooting mode, the priority of the captured image reception part 240 and the display processor 260 provided in the image processing device 20 is set to be high.

In the following description, it is assumed that each of the captured image reception part 240 and the display processor 260 provided in the image processing device 20 is a processing block with a high priority. In other words, the image processor 250 provided in the image processing device 20 will be described as a processing block having a low priority.

The bus arbiter 220 is an arbitration circuit (so-called a DMA arbitration circuit) that arbitrates an access request (DMA request) to the DRAM 30 by DMA transfer from each processing block in the image processing device 20 connected to the data bus 210 and accepts an access request to the DRAM 30 from any processing block. The bus arbiter 220 determines a processing block to accept (permit) the access request to the DRAM 30 among processing blocks each of which has output an access request signal (DMA request signal) based on the priority of each processing block provided in the image processing device 20.

At this time, when a priority switching signal SW indicating that the priority of the image processor 250 is increased is output from the image processor 250, the bus arbiter 220 increases the priority of the image processor 250, and a processing block that accepts (permits) the access request to the DRAM 30 is determined. In other words, even when the image processor 250 is a processing block with a low priority, the bus arbiter 220 arbitrates the access request to the DRAM 30 by DMA transfer from each processing block while increasing the priority of the image processor 250 in accordance with the priority switching signal SW.

Then, the bus arbiter 220 outputs an access reception signal (so-called a DMA permission signal) for notifying that the access request has been received to the processing block that arbitrates the access request to the DRAM 30 from each processing block, and as a result, determines to accept (permit) the access request.

Thereafter, the bus arbiter 220 transfers data via the data bus 210 with the processing block that has received the access request. At this time, the bus arbiter 220 outputs (transfers) to the DRAM interface part 230 information (access information) related to access to the DRAM 30 such as an address (including a bank) and an access direction (write or read) output together with the access request signal from the processing block that has received the access request. When performing write access for writing data to the DRAM 30, the bus arbiter 220 also outputs (transfers) the data output via the data bus 210 from the processing block that received the access request to the DRAM interface part 230. On the other hand, when performing read access for reading data from the DRAM 30, the bus arbiter 220 outputs (transfers) to the processing block, which has received the access request via the data bus 210, data output from the DRAM interface part 230 according to the output access information to the DRAM 30.

Even when the priority of the image processor 250 is increased according to the priority switching signal SW output from the image processor 250, in the operation of the bus arbiter 220, the operation of arbitrating the access request to the DRAM 30 from each processing block based on the priority is the same as the operation of the existing bus arbiter (so-called DMA arbitration circuit). That is, the operation in which the bus arbiter 220 arbitrates the access request to the DRAM 30 based on the priority can be easily considered based on the technology of the existing bus arbiter (so-called DMA arbitration circuit). Accordingly, a detailed description of the operation is omitted in which the bus arbiter 220 arbitrates the access request to the DRAM 30 by DMA transfer from each processing block in a state where the priority of the image processor 250 is increased in accordance with the priority switching signal SW output from the image processor 250.

The DRAM interface part 230 is a DRAM controller that actually transfers data to and from the DRAM 30 based on the access information output from the bus arbiter 220, that is, actually transfers data (DMA transfer). The DRAM interface part 230 controls the DRAM 30 based on access information to the DRAM 30 that is output from the processing block of which the bus arbiter 220 has received the access request and that is output (transferred) from the bus arbiter 220. At this time, when performing write access to the DRAM 30, the DRAM interface part 230 stores (writes) the data output (transferred) from the bus arbiter 220 and output to the data bus 210 by the processing block of which the bus arbiter 220 has received the access request, in the storage area of the address of the DRAM 30 specified by the access information. On the other hand, when performing read access to the DRAM 30, the DRAM interface part 230 reads the data stored in the storage area of the address of the DRAM 30 specified by the access information and outputs the read data to the bus arbiter 220.

The captured image reception part 240 is a processing block that performs various predetermined image processing on the pixel signal data output from the image sensor 10. The image processing that the captured image reception part 240 performs on the pixel signal data output from the image sensor 10 is so-called preprocessing such as scratch correction or shading correction. In the present invention, the image processing (preprocessing) performed by the captured image reception part 240 on the data of the pixel signal output from the image sensor 10 is not particularly limited. The captured image reception part 240 stores (writes) pixel signal data (hereinafter referred to as "preprocessed image data") after preprocessing in the DRAM 30 by DMA transfer That is, the captured image reception part 240 is also a DMA transfer part (bus master) that performs DMA transfer for storing (writing) the preprocessed image data in the DRAM 30. As described above, since the captured image reception part 240 is set to have a high priority, the captured image reception part 240 is a high-priority bus master.

When storing (writing) the preprocessed image data in the DRAM 30, the captured image reception part 240 outputs an access request signal (DMA request signal) for requesting write access to the DRAM 30, an address (DMA address) for specifying a storage area (including a bank) of the DRAM 30 for storing preprocessed image data, and an access direction signal (DMA write signal) indicating a write access direction to the DRAM 30, to the bus arbiter 220. After the output access request signal is received by the bus arbiter 220, that is, after the access acceptance signal (DMA permission signal) is input from the bus arbiter 220, the captured image reception part 240 outputs the preprocessed image data to the bus arbiter 220. As a result, the preprocessed image data output by the captured image reception part 240 is output to the DRAM 30 via the bus arbiter 220 and the DRAM interface part 230, and stored (written) in the storage area of the address (DMA address) output together with the access request signal.

The captured image reception part 240 may be configured to perform preprocessing after temporarily storing pixel signal data output from the image sensor 10. The captured image reception part 240 may be configured to temporarily store preprocessed image data that has been subjected to preprocessing, and then output the preprocessed image data to the bus arbiter 220 in DMA transfer.

The image processor 250 is a processing block that performs predetermined image processing on the preprocessed image data stored in the DRAM 30. The image processor 250 performs DMA transfer for acquiring (reading) preprocessed image data to be subjected to image processing, and DMA transfer for storing (writing) image data generated by performing image processing in the DRAM 30. More specifically, the image processor 250 acquires (reads) preprocessed image data to be subjected to image processing from the DRAM 30 by DMA transfer. Then, the image processor 250 performs predetermined image processing on the acquired preprocessed image data. Thereafter, the image processor 250 stores (writes) the image data after the image processing in the DRAM 30 by DMA transfer. As described above, the image processor 250 includes the bus master 2501, the image processing module 2502, the bus master 2503, and the priority switching control part 2504.

The bus master 2501 is a DMA transfer part that performs DMA transfer between the DRAM 30 and the image processing module 2502. The bus master 2501 performs DMA transfer for acquiring (reading) the preprocessed image data to be processed by the image processing module 2502 from the DRAM 30. That is, the bus master 2501 performs unidirectional (reading) DMA transfer (hereinafter referred to as "read DMA transfer") with the DRAM 30. As described above, the bus master 2501 includes the surface buffer 2501B.

The surface buffer 2501B is a data storage unit that temporarily stores (saves) image data (preprocessed image data) of a predetermined data amount (for example, the number of pixels). For example, the surface buffer 2501B includes a memory such as an SRAM (Static Random Access Memory).

The surface buffer 2501B may have a so-called double buffer configuration including two storage capacity sets for storing image data (preprocessed image data) having a predetermined data amount (for example, the number of pixels). That is, the plane buffer 2501B have a configuration in which, by alternately switching between writing image data to one storage capacity group and reading image data from the other storage capacity group, input/output of image data can be performed at the same time in units of one read DMA transfer in the bus master 2501. The operation of the bus master 2501 provided with the surface buffer 2501B having a double buffer configuration can be easily considered based on a technique for controlling the operation of an existing double buffer. Therefore, a detailed description of the operation of the bus master 2501 including the surface buffer 2501E having a double buffer configuration is omitted.

The bus master 2501 temporarily stores (saves) the preprocessed image data acquired (read) from the DRAM 30 by the read DMA transfer in the surface buffer 2501B, and, after storing (saving) the preprocessed image data having a predetermined amount of data, in response to a request from the image processing module 2502, the preprocessed image data stored (saved) is output to the image processing module 2502. That is, the bus master 2501 outputs preprocessed image data acquired (read) from the DRAM 30 by read DMA transfer to the image processing module 2502 in accordance with the timing at which the image processing module 2502 performs image processing. As described above, since the priority of the image processor 250 is set low, the bus master 2501 is a low priority bus master.

The image processing module 2502 is a processing module that performs predetermined image processing on the preprocessed image data in the image processor 250. Examples of the image processing performed by the image processing module 2502 on the preprocessed image data include various image processing for display and image processing for recording, such as noise removal processing, YC (luminance color difference) conversion processing, distortion correction processing, motion detection processing, resizing processing, still image compression processing such as JPEG compression processing, and video image compression processing such as MPEG compression processing or H.264 compression processing. In the present invention, the image processing performed by the image processing module 2502 on the preprocessed image data is not particularly limited. The image processing module 2502 may be configured to perform image processing, for example, still image expansion processing such as JPEG expansion processing, video image expansion processing such as MPEG expansion processing and H.264 expansion processing, on record image data recorded on a recording medium (not shown).

The image processing module 2502 performs the above-described predetermined image processing on the acquired preprocessed image data, to generate image data of still image (hereinafter referred to as "still image data") or image data of video image (hereinafter referred to as "video image data"). In the following description, when still image data and video image data generated by the image processing module 2502 are expressed without distinction, they are referred to as "image-processed image data".

Also, the image processing module 2502 notifies the priority switching control part 2504 of the progress status of the image processing performed on the acquired preprocessed image data. In the image processor 250 shown in FIG. 1, the image processing module 2502 notifies the progress status of the image processing applied to the preprocessed image data by the image processing progress status signal PS. The image processing progress status signal PS is a signal that represents, for example, the ratio (percentage) at which the image processing of the image processing module 2502 for all preprocessed image data for one frame has been completed. Here, the ratio (percentage) of the image processing that is indicated by the image processing progress status signal PS can be calculated by the image processing module 2502 based on, for example, the total number of pixels of the preprocessed image for one frame and the number of pixels for which image processing has been completed up to the current time. In addition, the image processing module 2502 can also calculate the ratio (percentage) of image processing completed based on the information on the coordinates of the pixel that is currently performing image processing within the area of the preprocessed image of one frame.

The image processing performed on the preprocessed image data by the image processing module 2502 does not necessarily perform image processing on the entire area of the image of one frame. For example, in distortion correction processing or JPEG compression processing, when an image area of one frame is divided into a plurality of rectangular blocks, processing for each of the divided blocks is sequentially performed, and processing for all the blocks is completed, the image processing for the entire area of the image of one frame is completed. In this case, the image processing module 2502 may output a signal indicating the number of blocks for which image processing has been completed up to the current time among a plurality of divided blocks, as the image processing progress status signal PS to be output to notify the progress status of the image processing performed on the preprocessed image data.

At this time, in the image processing performed by dividing the image area of one frame into a plurality of blocks, the image processing module 2502 may have different numbers of pixels in each divided block. For example, in the distortion correction processing, in order to perform image processing on each divided block, preprocessed image data of the same pixel may be used for image processing of different blocks. For this reason, the number of pixels to be processed before the image processing module 2502 completes the image processing for the entire region of the image of one frame is larger than the number of pixels for one frame. In this case, the image processing module 2502 may output a signal representing the total number of pixels included in the respective blocks that have been subjected to image processing up to the current time among the total number of pixels acquired by adding the different pixels included in all blocks that need to perform image processing before outputting one frame of image-processed image data (still image data or video image data), as the image processing progress status signal PS.

Further, the image processing performed by the image processing module 2502 on the preprocessed image data is not limited to the image processing performed for each frame. For example, in the video image compression processing, since a plurality of frames are processed as one group (so-called GOP: Group of Pictures), the image processing module 2502 also performs image processing in units of this group. In this case, the image processing module 2502 may output, as the image processing progress status signal PS, a signal indicating the number of frames for which image processing has been completed up to the current time among a plurality of frames included in one group unit.

The bus master 2503 is a DMA transfer part that performs DMA transfer between the DRAM 30 and the image processing module 2502. The bus master 2503 performs DMA transfer in which image-processed image data (still image data or video image data) after the image processing module 2502 performs image processing is stored (written) in the DRAM 30. That is, the bus master 2503 performs unidirectional (write) DMA transfer (hereinafter referred to as "write DMA transfer") with the DRAM 30. As described above, the bus master 2503 includes the surface buffer 2503B.

The surface buffer 2503B is a data storage unit that temporarily stores (saves) image data (still image data or video image data) having a predetermined data amount (for example, the number of pixels). The surface buffer 2503B is also configured by a memory such as an SRAM.

Similarly to the surface buffer 2501B, the surface buffer 2503B may have a configuration of a double buffer having two storage capacity sets for storing image data (still image data or video image data) of a predetermined data amount (for example, the number of pixels). The operation of the bus master 2503 provided with the surface buffer 2503B having the double buffer configuration can be easily considered based on the technology for controlling the operation of the existing double buffer, similarly to the operation of the bus master 2501 including the surface buffer 2501B having the double buffer configuration. Therefore, a detailed description of the operation of the bus master 2503 including the surface buffer 2503B having a double buffer configuration is omitted.

The bus master 2503 temporarily stores (saves) image-processed image data (still image data or video image data) generated by image processing by the image processing module 2502 in the surface buffer 2503B, and after storing (saving) image-processed image data of a predetermined data amount, outputs the stored (saved) image-processed image data to the bus arbiter 220 in accordance with the timing of DMA transfer, to be stored (written) in the DRAM 30. As described above, since the priority of the image processor 250 is set low, the bus master 2503 is also a low-priority bus master.

The priority switching control part 2504 notifies the bus arbiter 220 of the priority of DMA transfer of the image processor 250 to be considered when the bus arbiter 220 arbitrates access requests to the DRAM 30 from the respective processing blocks.

More specifically, the priority switching control part 2504 calculates the remaining processing time when the image processing module 2502 performs image processing based on the image processing progress status signal PS output from the image processing module 2502. Then the priority switching control part 2504 determines the urgency of image processing performed by the image processing module 2502 based on the calculated remaining processing time, the limit time of image processing defined as the time that the image processing module 2502 needs to complete image processing for one frame, and the current elapsed time. The priority switching control part 2504 generates a priority switching signal SW for notifying the urgency of image processing performed by the image processing module 2502 based on the determined result. The priority switching signal SW is also a signal for requesting switching (changing) of DMA transfer priority in the image processor 250.

The parameter used by the priority switching control part 2504 to determine the priority of DMA transfer of the image processor 250, that is, the parameter used to determine the urgency of image processing performed by the image processing module 2502 is, for example, set in the register of the priority switching control part 2504 by a CPU (Central Processor) (not shown) provided in the image processing device 20.

Note that a CPU (not shown) is a control part that controls the entire image processing device 20 by controlling each component included in the image processing device 20. A CPU (not shown) controls the entire image processing device 20 in accordance with a program and data for controlling each component. Note that a CPU (not shown) may control components included in the imaging device 1. A program and data for controlling each component included in the image processing device 20 by a CPU (not shown) may be stored in the DRAM 30 connected to the data bus 210 via the DRAM interface part 230 and the bus arbiter 220. In this case, a CPU (not shown) controls the entire image processing device 20 by reading out and executing programs and data stored in the DRAM 30 via the bus arbiter 220 and the DRAM interface part 230.

The priority switching control part 2504 outputs the generated priority switching signal SW to the bus arbiter 220, so as to notify that it is desired that the arbitration be performed in a state where the priority of the image processor 250 is increased, that is, it is desired that DMA transfer (read DMA transfer or write DMA transfer) in the image processor 250 is urgently accepted (permitted). Thereby, when arbitrating access requests to the DRAM 30 from the respective processing blocks, the bus arbiter 220 switches the priority of the image processor 250 to a higher level based on the priority switching signal SW, and accepts (permits) the access request from the image processor 250 preferentially. As a result, the image processor 250 can complete the image processing by the specified limit time without causing the image processing to be performed to be stopped due to a waiting state.

When notifying that DMA transfer in the image processor 250 is urgently accepted (desired), the priority switching control part 2504 may also notify information indicating which of the access request (read DMA transfer) from the bus master 2501 and the access request (write DMA transfer) from the bus master 2503 is to be accepted (permitted) with priority. That is, the priority switching control part 2504 may also notify information indicating which of acquisition of the preprocessed image data to be subjected to image processing by the image processing module 2502 from the DRAM 30 and storage (writing) of the image-processed image data in the DRAM 30 after the image processing module 2502 performs image processing is prioritized.

The display processor 260 is a processing block that acquires (reads out) image-processed image data (still image data or video image data) stored in the DRAM 30 and displays a display image corresponding to the acquired image-processed image data on the display device 40. The display processor 260 acquires (reads out) image-processed image data to be displayed on the display device 40 from the DRAM 30 by DMA transfer. That is, the display processor 260 is also a DMA transfer part (bus master) that performs DMA transfer for acquiring (reading out) image-processed image data from the DRAM 30. As described above, the display processor 260 is a high-priority bus master because the display processor 260 has a high priority.

When acquiring (reading) the image-processed image data from the DRAM 30, the display processor 260 outputs an access request signal (DMA request signal) for requesting read access to the DRAM 30, an address (DMA address) specifying a storage area (including a bank) of the DRAM 30 that acquires the image-processed image data, and an access direction signal (DMA read signal) indicating the read access direction to the DRAM 30, to the bus arbiter 220. Then, after the access request signal that has been output is received by the bus arbiter 220, that is, after the access reception signal (DMA permission signal) is input from the bus arbiter 220, the display processor 260 acquires the image-processed image data that the DRAM interface part 230 reads from the DRAM 30 to output via the bus arbiter 220. Then, the display processor 260 outputs a display image corresponding to the acquired image-processed image data to the display device 40 for display.

The display processor 260 may be configured to output and display a display image generated by performing predetermined display processing on the image-processed image data read (acquired) from the DRAM 30 on the display device 40. The display processing performed by the display processor 260 on the image-processed image data includes, for example, processing for converting the size of the display image to the size of the image displayed by the display device 40, and processing of superimposing an on-screen display (OSD) image for displaying various information related to a still image or a video image such as a shooting date and time. However, in the present invention, the display processing performed by the display processor 260 on the image-processed image data is not particularly limited. In addition, the display processor 260 may be configured to perform display processing after temporarily storing image-processed image data read (acquired) from the DRAM 30. Further, the display processor 260 may be configured to temporarily store the display image data subjected to the display process, and then output and display the stored display image data on the display device 40.

With such a configuration, the imaging device 1 captures a still image or a video image of the subject by the image sensor 10 and causes the display device 40 to display a display image corresponding to the captured still image or video image. The imaging device 1 can also record a record image corresponding to a still image or a video image captured by the image sensor 10 on a recording medium (not shown).

In the imaging device 1, the image processor 250 and the bus arbiter 220 provided in the image processing device 20 constitute the memory access device according to the first embodiment. In other words, in the image processing device 20, the image processor 250, which is a processing block having a low priority among processing blocks that transfer image data to and from the DRAM 30 by DMA transfer, is combined with the bus arbiter 220, thereby configuring the memory access device according to the first embodiment.

In the memory access device according to the first embodiment, the image processing module 2502 outputs an image processing progress status signal PS for notifying the progress status of the image processing being performed to the priority switching control part 2504. In the memory access device according to the first embodiment, the priority switching control part 2504 determines the urgency of the image processing to be performed by the image processing module 2502 based on the image processing progress status indicated by the image processing progress status signal PS output from the image processing module 2502, and outputs a priority switching signal SW for notifying the priority of DMA transfer in the image processor 250 to the bus arbiter 220. Thereby, in the memory access device according to the first embodiment, when the bus arbiter 220 accepts (permits) an access request from each processing block, in a case in which the priority switching signal SW indicates that the urgency of the image processing performed in the image processor 250 is high, the priority of the image processor 250 is switched to a high priority, and the access request from the image processor 250 is preferentially accepted (permitted).

As a result, the image processor 250 (more specifically, the image processing module 2502) can complete the image processing by a limit time defined as the time required to complete the image processing for one frame, without stopping the image processing to be performed. As a result, in the system (imaging device 1 or image processing device 20) in which the memory access device according to the first embodiment is mounted, a series of image processing on the image data can be performed without delay, without stopping the operation of the image processor 250 (image processing module 2502), which may cause a failure in the operation or function of the system.

Here, the operation of the image processor 250 will be described. First, a basic operation will be described when the image processor 250 acquires preprocessed image data from the DRAM 30 by DMA transfer, and after performing image processing, stores (writes) the image-processed image data in the DRAM 30 by DMA transfer.

When the image processor 250 performs image processing, first, the bus master 2501 acquires (reads) preprocessed image data to be subjected to image processing from the DRAM 30 by DMA transfer. When acquiring (reading) preprocessed image data from the DRAM 30, the bus master 2501 outputs an access request signal (DMA request signal) for requesting a read access to the DRAM 30, an address (DMA address) specifying a storage area (including a bank) of the DRAM 30 for acquiring preprocessed image data, and an access direction signal (DMA read signal) indicating a read access direction to the DRAM 30, to the bus arbiter 220. After the access request signal that has been output is received by the bus arbiter 220, that is, after the access acceptance signal (DMA permission signal) is input from the bus arbiter 220, the bus master 2501 temporarily stores the preprocessed image data read from the DRAM 30 by the DRAM interface part 230 and output via the bus arbiter 220 in the plane buffer 2501B. Thereafter, the bus master 2501 stores (saves) preprocessed image data having a predetermined amount of data in the surface buffer 2501B, and then reads the preprocessed image data stored in the surface buffer 2501B in response to a request from the image processing module 2502, to output to the image processing module 2502. As a result, the image processing module 2502 performs predetermined image processing on the preprocessed image data output from the bus master 2501 (more specifically, the surface buffer 2501B) to acquire image-processed image data (still image data or video image data), and outputs the generated image-processed image data to the bus master 2503.

The bus master 2503 temporarily stores the image-processed image data output from the image processing module 2502 in the surface buffer 2503B. Thereafter, the bus master 2503 stores (saves) image-processed image data of a predetermined amount of data in the surface buffer 2503B, and then stores (writes) the image-processed image data stored (saved) in the surface buffer 2503B in the DRAM 30 by DMA transfer. When storing (writing) the image-processed image data in the DRAM 30, the bus master 2503 outputs an access request signal (DMA request signal) for requesting a write access to the DRAM 30, an address (DMA address) specifying a storage area (including a bank) of the DRAM 30 for storing the image-processed image data, and an access direction signal (DMA write signal) indicating a write access direction to the DRAM 30, to the bus arbiter 220. Then, after the output access request signal is received by the bus arbiter 220, that is, after the access acceptance signal (DMA permission signal) is input from the bus arbiter 220, the bus master 2503 reads out the image-processed image data stored in the plane buffer 2503B and outputs it to the bus arbiter 220. As a result, the image-processed image data (still image data or video image data) output from the bus master 2503 is output to the DRAM 30 via the bus arbiter 220 and the DRAM interface part 230, and is stored (written) in the storage area of the address (DMA address) output together with the access request signal.

As described above, when acquiring (reading) the pre-processed image data to be subjected to image processing from the DRAM 30 and when storing (writing) the image-processed image data (still image data or video image data) after the image processing is performed in the DRAM 30, the image processor 250 transfers each image data to and from the DRAM 30 via the surface buffer 2501B and the surface buffer 2503B provided in the bus master 2501. Thus, in the image processor 250, the image processing module 2502 can perform predetermined image processing without being affected by the timing of DMA transfer performed with the DRAM 30.

As described above, the image processor 250 is a processing block whose priority is set low in the image processing device 20. For this reason, in a state where the access request to the DRAM 30 by each of the captured image reception part 240 and the display processor 260 having a high priority is increased and the data bus 210 is congested, the image processor 250 does not always accept (permit) an access request from the bus arbiter 220 to the DRAM 30. However, the image processor 250 is also a processing block responsible for the operation of the imaging device 1 equipped with the image processing device 20 although real-time performance is not required, and therefore if the image processing is not completed within a predetermined limit time of the image processing, the operation of the imaging device 1 as a system will fail.

Therefore, in the memory access device according to the first embodiment, the priority switching control part 2504 controls so that the priority of accepting (permitting) an access request from the image processor 250 is increased before the image processing to be performed by the image processing module 2502 is stopped due to a waiting state, based on the image processing progress status represented by the image processing progress status signal PS output from the image processing module 2502. That is, in the memory access device according to the first embodiment, the priority switching control part 2504 controls the low priority set in the image processor 250 to switch to the high priority. At this time, the priority switching control part 2504 determines the urgency of image processing performed by the image processing module 2502. This determination is performed by calculating the remaining processing time in the image processing performed by the image processing module 2502. In other words, the priority switching control part 2504 determines whether or not the remaining image processing performed by the image processing module 2502 is completed by the limit time of the image processing defined as the time required for the image processing module 2502 to complete the image processing for one frame.

Figure 2:
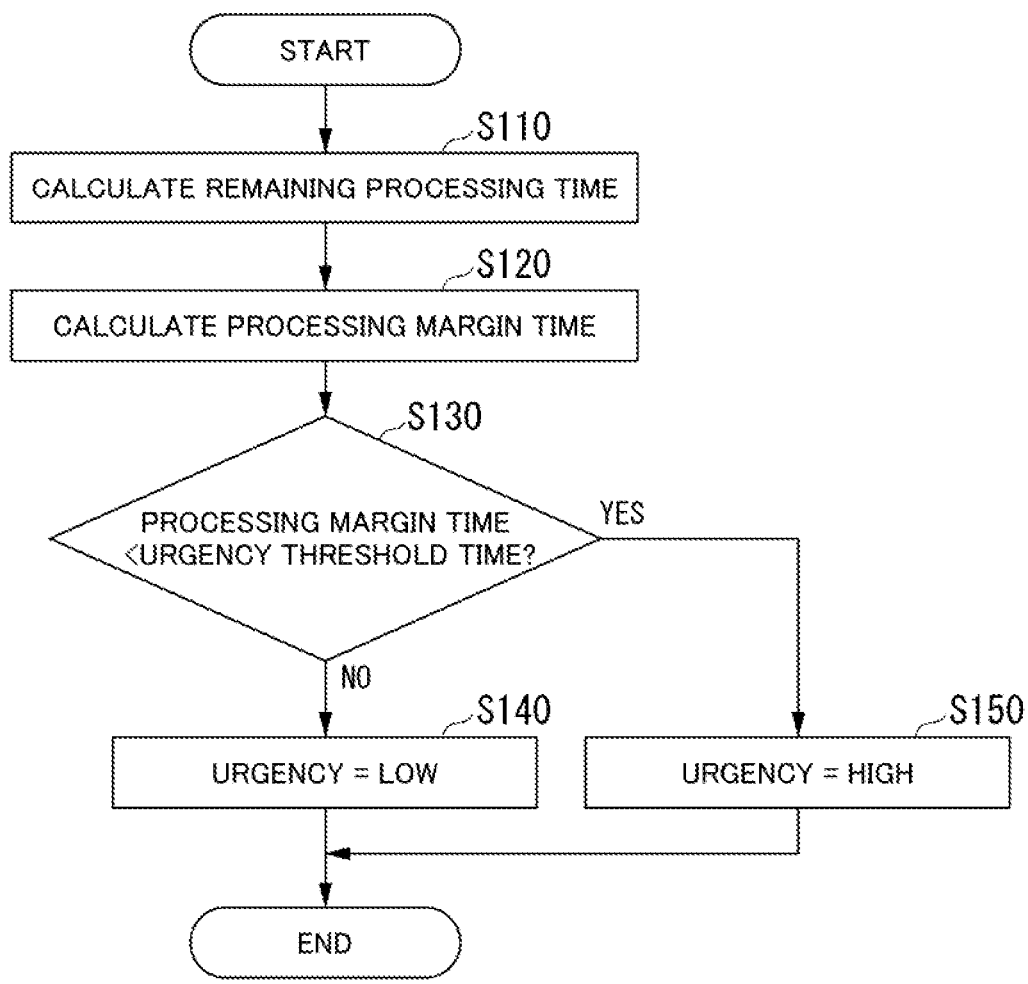
FIG. 2 is a flowchart showing a processing procedure of processing for determining an urgency of image processing in the memory access device according to the first embodiment of the present invention.

Next, a method in which the priority switching control part 2504 determines the urgency of image processing performed by the image processor 250 (image processing module 2502) in the memory access device according to the first embodiment will be described. FIG. 2 is a flowchart showing a processing procedure for determining the urgency of image processing in the memory access device according to the first embodiment of the present invention.

In the process of determining the urgency of image processing performed by the image processing module 2502 by the priority switching control part 2504, first, the remaining processing time when the image processing module 2502 performs image processing is calculated based on the ratio (percentage) of the completion of the image processing represented by the image processing progress status signal PS output from the image processing module 2502 (step S110).

In the priority switching control part 2504, parameters used for calculating the remaining processing time in the image processing module 2502 are set in a register. Note that a calculation method of the remaining processing time calculated by the priority switching control part 2504 in step S110 will be described later.

Subsequently, the priority switching control part 2504 calculates a margin time (hereinafter referred to as "processing margin time") when the image processing module 2502 performs image processing, based on the remaining processing time calculated in step S110, the limit time of image processing that is defined in advance and set in the register, and the current elapsed time (step S120).

Note that, in the priority switching control part 2504, parameters used for calculating the processing margin time in the image processing module 2502 are set in a register. Note that a method for calculating the processing margin time calculated by the priority switching control part 2504 in step S120 will be described later.

Subsequently, the priority switching control part 2504 compares the calculated processing margin time with the urgency threshold time, and determines whether the calculated processing margin time is shorter than the urgency threshold time (step S130). Accordingly, the priority switching control part 2504 determines the urgency of image processing performed by the image processing module 2502.

In the priority switching control part 2504, a parameter used for determining the urgency of image processing performed by the image processing module 2502, that is, the urgency threshold time is set in the register.

When it is determined in step S130 that the calculated processing margin time is not shorter than the urgency threshold time (the processing margin time is equal to or greater than the urgency threshold time) ("NO" in step S130), the priority switching control part 2504 determines that the urgency of image processing performed by the image processing module 2502 is not high (low), and proceeds to step S140. Then, the priority switching control part 2504 generates a priority switching signal SW indicating that the priority of the image processor 250 is not increased, that is, the priority remains low (step S140).

On the other hand, when it is determined in step S130 that the calculated processing margin time is shorter than the urgency threshold time ("YES" in step S130), the priority switching control part 2504 determines that the urgency of the image processing performed by the image processing module 2502 is high, and the process proceeds to step S150. Then, the priority switching control part 2504 generates a priority switching signal SW that represents increasing the priority of the image processor 250 (step S150).

Through such processing, the priority switching control part 2504 determines the urgency of the image processing performed by the image processing module 2502 and generates the priority switching signal SW for notifying switching of the priority set in the image processor 250 based on the determined result. Then, the priority switching control part 2504 outputs the generated priority switching signal SW to the bus arbiter 220. Thus, in a case of accepting (permitting) an access request from each processing block, when the priority switching signal SW indicates that the urgency of the image processing performed by the image processor 250 is to be increased, the bus arbiter 220 switches the priority of the image processor 250 to a higher priority, and accepts (permits) an access request from the image processor 250 with priority.

Next, a method for calculating the remaining processing time when the image processing module 2502 performs image processing, which is calculated by the priority switching control part 2504 in the processing of step S110, will be described. As described above, the image processing progress status signal PS is a signal representing the progress status of the image processing of the image processor 250 with respect to all the preprocessed image data for one frame as a ratio (percentage) that has been completed up to the current time.

The priority switching control part 2504 calculates the remaining processing time when the image processing module 2502 performs image processing based on the ratio (percentage) of completion of image processing represented by the image processing progress status signal PS. There are various calculation methods corresponding to the image processing performed by the image processing module 2502 as the calculation method of the remaining processing time in the priority switching control part 2504.

First, the first calculation method of the remaining processing time will be described. The first calculation method is a method of calculating the remaining processing time based on the processing time when the image processing module 2502 performs image processing of image data for one frame. That is, in the first calculation method, the remaining processing time is calculated based on the time until the image processing module 2502 completes image processing for one frame. In the first calculation method, the priority switching control part 2504 calculates the remaining processing time using the following equation (1) and the following equation (2).

$$\text{(Total processing time)}=\text{(Processing speed)}\times\text{(Total number of output pixels)} \quad (1)$$

$$\text{(Remaining processing time)}=\text{(Total processing time)}\times(1-\text{(Processing completion rate)}) \quad (2)$$

In the above equation (1), the total processing time is a processing time required for the image processing module 2502 to process one frame of image. In the above equation (1), the processing speed is a processing speed at which the image processing module 2502 performs image processing on the preprocessed image data of one pixel. In other words, the processing speed is a processing time required for the image processing module 2502 to perform image processing of preprocessed image data of one pixel. In the above equation (1), the total number of output pixels is the number of pixels of the image-processed image data (still image data or video image data) for one frame on which the image processing module 2502 performs image processing to output.

In the above equation (2), the remaining processing time is a processing time required until the image processing module 2502 completes the image processing that has not been completed up to the current time. In the above equation (2), the processing completion rate is a ratio (percentage) of image processing that has been completed by the image processing module 2502 up to the current time, as indicated by the image processing progress status signal PS.

Note that each of the processing speed and the total number of output pixels used in the above equation (1) for the priority switching control part 2504 to calculate the remaining processing time by the first calculation method is set in the register of the priority switching control part 2504 by a CPU (not shown), as a parameter used to calculate the remaining processing time.

Next, a second calculation method for the remaining processing time will be described. In the second calculation method, the image processing module 2502 divides an image area of one frame into a plurality of rectangular blocks including preprocessed image data having the same number of pixels, and, when image processing is performed for each divided block, the remaining processing time is calculated based on the processing time of the image processing for each block.

In the second calculation method, similarly to the first calculation method, the remaining processing time is calculated based on the processing time when the image processing module 2502 performs image processing of image data for one frame. In the second calculation method, in order to correspond to the image processing performed for each block divided by the image processing module 2502, the priority switching control part 2504 calculates the remaining processing time by the following equation (3) and the following equation (4).

$$\text{(Number of remaining blocks)}=\text{(Total number of blocks)}-\text{(Number of processed blocks)} \quad (3)$$

$$\text{(Remaining processing time)}=\text{(Number of remaining blocks)}\times\text{(Number of pixels in one block)}\times\text{(Processing speed)} \quad (4)$$

In the above equation (3), the number of remaining blocks is the number of blocks that need to be processed before the image processing module 2502 outputs image-processed image data (still image data or video image data) for one frame. That is, the remaining number of blocks is the number of blocks that have not been subjected to image processing at the current time among the blocks divided by the image processing module 2502. In the above equation (3), the total number of blocks is the number of blocks acquired by dividing the image area of one frame so that the image processing module 2502 performs image processing of image data for one frame. In the above equation (3), the processing completion block number is the number of blocks that the image processing module 2502 has completed image processing up to the current time, which is indicated by the image processing progress status signal PS.

In the above equation (4), the remaining processing time is the processing time required until the image processing module 2502 completes image processing that has not been completed up to the current time. In other words, the remaining processing time is a processing time required for image processing on the blocks of the remaining number of blocks for which image processing has not been completed, out of the processing time required until image processing for all the blocks divided by the image processing module 2502 is completed. In the above equation (4), the remaining number of blocks is the number of remaining blocks calculated in the above equation (3). In the above equation (4), the number of pixels in one block is the number of pixels included in each block divided by the image processing module 2502. In the above equation (4), the processing speed is the same as the processing speed in the above equation (1) of the first calculation method.

Each of the total number of blocks used by the priority switching control part 2504 in the above equation (3) to calculate the remaining processing time by the second calculation method, and the number of pixels in one block and the processing speed used in the above equation (4) is set in a register of the priority switching control part 2504 by a CPU (not shown) as a parameter used for calculating the remaining processing time.

Next, a third method for calculating the remaining processing time will be described. In the third calculation method, in a case where the image processing module 2502 performs image processing by dividing an area of an image of one frame into a plurality of blocks, even when the number of pixels included in each block is different, the remaining processing time is calculated based on the processing time of the image processing for each block. That is, this is a method of calculating the remaining processing time based on the processing time of the image processing for which the time required for processing differs for each divided block.

Also in the third calculation method, as in the first calculation method and the second calculation method, the remaining processing time is calculated based on the processing time when the image processing module 2502 performs image processing of image data for one frame. In the third calculation method, since the number of pixels included in each block divided by the image processing module 2502 is different, the priority switching control part 2504 calculates uses the remaining processing time by the following expressions (5) and (6).

(Number of remaining input pixels)=(Total number of input pixels)−(Current number of input pixels)     (5)

(Remaining processing time)=(Remaining number of input pixels)×(Processing speed)     (6)

In the above equation (5), the number of remaining input pixels is the total number of different pixels included in all blocks that need to be image-processed before the image processing module 2502 outputs image-processed image data (still image data or video image data) for one frame. That is, the remaining number of input pixels is the total number of different pixels included in each block that has not been subjected to image processing at the current time in each block divided by the image processing module 2502. In the above equation (5), the total number of input pixels is the total number of pixels input to the image processing module 2502 until the image processing module 2502 outputs image-processed image data (still image data or video image data) for one frame. Here, the total number of input pixels is the total number of different pixels included in all the blocks used by the image processing module 2502 to perform image processing. That is, the total number of input pixels is larger than the number of pixels for one frame. In the above equation (5), the current number of input pixels is the total number of different pixels included in each block for which image processing has been completed up to the current time, which is represented by the image processing progress status signal PS.

In the above equation (6), the remaining processing time is a processing time required until the image processing module 2502 completes the image processing that has not been completed up to the current time. In other words, the remaining processing time is a processing time required for image processing for each block for which image processing has not completed among the processing time required for completing image processing for all the blocks divided by the image processing module 2502. In the above equation (6), the remaining number of input pixels is the number of remaining input pixels calculated in the above equation (5). In the above equation (6), the processing speed is the same as the processing speed in the above equation (1) of the first calculation method and the above equation (4) of the second calculation method.

Each of the total number of input pixels and the current number of input pixels used by the priority switching control part 2504 in the above equation (5) to calculate the remaining processing time by the third calculation method, and the processing speed used in the above equation (6) is set in a register of the priority switching control part 2504 by a CPU (not shown) as a parameter used for calculating the remaining processing time. At this time, the CPU (not shown) may be configured to set the number of remaining input pixels used in the above equation (6) in the register of the priority switching control part 2504, instead of the total number of input pixels used in the above equation (5) and the current number of input pixels. Further, the image processing module 2502 may output a signal indicating the number of remaining input pixels to the priority switching control part 2504 as the image processing progress status signal PS.

In this way, the priority switching control part 2504 calculates the remaining processing time by the calculation methods as shown in the first calculation method to the third calculation method in the process of step S110. Then, the priority switching control part 2504 calculates a processing margin time when the image processing module 2502 performs image processing in the processing of step S120.

Next, a method for calculating the processing margin time calculated by the priority switching control part 2504 in the process of step S120 will be described. As described above, the processing margin time is calculated based on the remaining processing time calculated in step S110, the limit time of image processing that is defined in advance and set in the register, and the current elapsed time. The image processing module 2502 calculates the processing margin time by the following equation (7).

(Processing margin time)=(Limit time)−(Current elapsed time−remaining processing time)     (7)

In the above equation (7), the limit time is a limit time for image processing defined as the time required for the image processing module 2502 to complete image processing for one frame. In the above equation (7), the current elapsed time is an elapsed time from when the image processing module 2502 starts image processing to the current time. In the above equation (7), the remaining processing time is the remaining processing time calculated by any one of the first calculation method to the third calculation method described above.

Each of the limit time used in the above equation (7) for the priority switching control part 2504 to calculate the processing margin time and the current elapsed time is set in the register of the priority switching control part 2504 by a CPU (not shown) as a parameter used to calculate the processing margin time. The image processing module 2502 may be configured to measure an elapsed time from the timing at which image processing is started by a timer (not shown) provided in the priority switching control part 2504 or the image processor 250, as the current elapsed time used in the above equation (7) for the priority switching control part 2504 to calculate the processing margin time.

In this way, the priority switching control part 2504 calculates the processing margin time when the image processing module 2502 performs image processing by the above equation (7) in the processing of step S120. Then, the priority switching control part 2504 compares the calculated processing margin time with the urgency threshold time in the process of step S130, so as to determine the urgency of the image processing performed by the image processing module 2502, and generates a priority switching signal SW corresponding to the determined urgency of image processing to output to the bus arbiter 220.

After multiplying either one or both of the limit time and the remaining processing time by a predetermined time coefficient for providing a margin in order to provide a further margin for the processing margin time, the image processing module 2502 may calculate the processing margin time by the above equation (7). Here, the time coefficient is a coefficient, for example, defined as a margin that can avoid the influence of the loss time by taking into account the loss time of the DRAM 30 in each DMA transfer performed by the bus master 2501 and the bus master 2503. For example, the time coefficient defines a limit time and a ratio (percentage) to the remaining processing time. The loss time in DMA transfer is a predetermined time (fixed time) in which there is a restriction, which exists as a restriction of a normal DRAM, that control cannot be accepted, for example, when switching from reading data to writing data, when switching from writing data to reading data, when accessing the storage area (bank) at the same address continuously, or the like. The time coefficient for allowing the priority switching control part 2504 to further increase the processing margin time may be set in the register of the priority switching control part 2504 as a parameter used for calculating the processing margin time by a CPU (not shown).

The limit time is defined as a time until the image processing by the image processing module 2502 is completed, in order to prevent a waiting state from occurring in the image processing performed by the image processing module 2502 so that the operation and function of the imaging device 1 and the image processing device 20 as a system are not broken. In other words, the limit time is set based on the idea that the priority switching control part 2504 controls as the priority at which the access request output by the image processor 250 is accepted (permitted) by the bus arbiter 220 is increased before the image processing performed by the image processor 250 is stopped due to the occurrence of a waiting state. For this reason, the limit time is set in various ways depending on the image processing performed by the image processing module 2502.

Here, an example of the concept of the limit time set by the image processing performed by the image processing module 2502 will be described. For example, consider a case where the operation mode of the imaging device 1 is a shooting mode for shooting a still image of a subject. In this case, the image processing module 2502 needs to generate image-processed image data (still image data) to store (write) in the DRAM 30 until the display processor 260 acquires (reads out) the image-processed image data stored in the DRAM 30 for displaying a display image corresponding to the image-processed image data on the display device 40. For this reason, the limit time is set to a periodic time based on the timing at which the display processor 260 acquires (reads) the image-processed image data of each frame from the DRAM 30.

Figure 3:
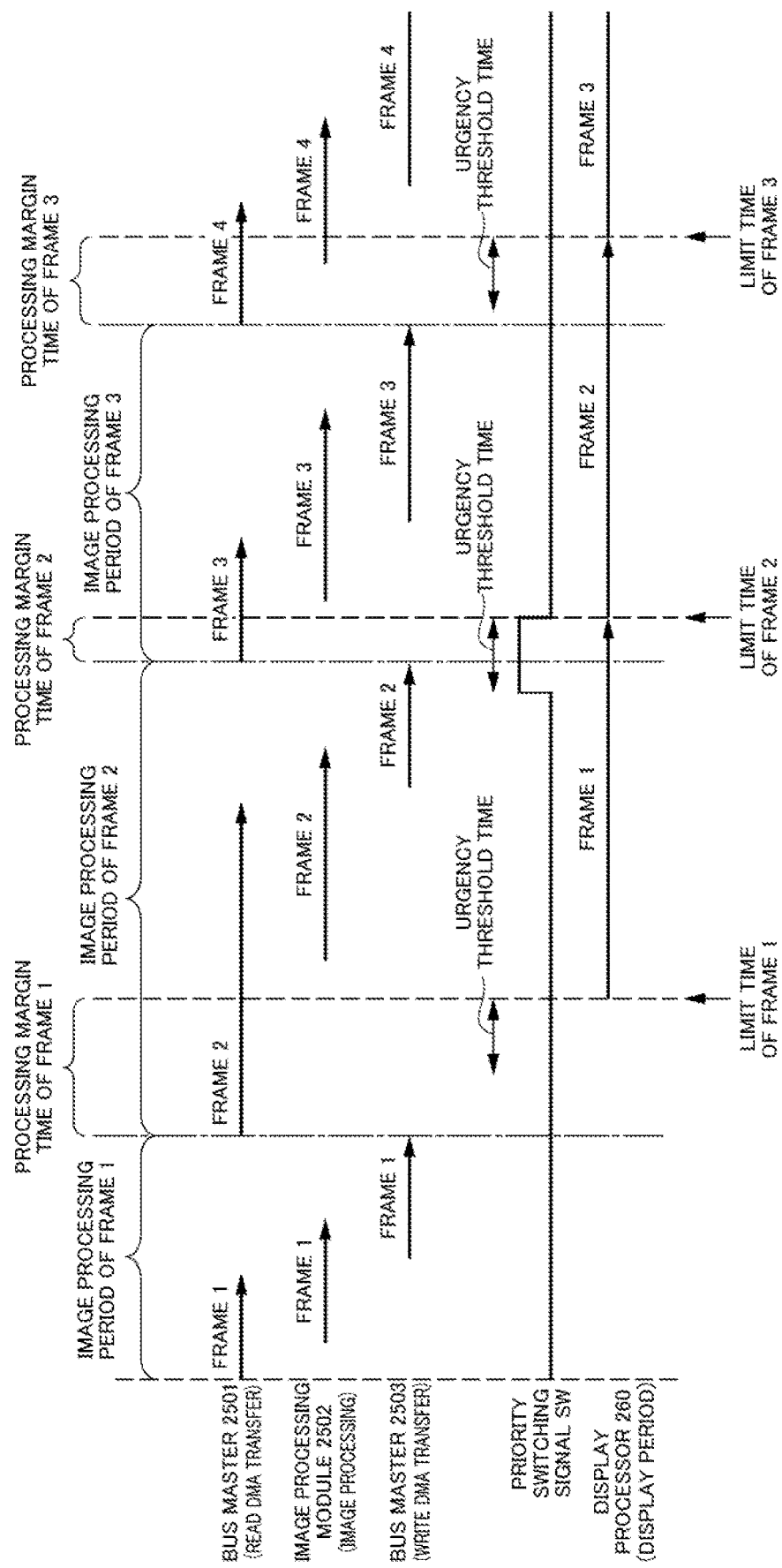
FIG. 3 is a diagram schematically showing an example of a relationship between a limit time and an image processing period in the memory access device according to the first embodiment of the present invention.

In this case, the relationship between the limit time and the period during which the image processor 250 performs image processing is as shown in FIG. 3. FIG. 3 is a diagram schematically showing an example of the relationship between the limit time and the image processing period in the memory access device according to the first embodiment of the present invention. In FIG. 3, an example of the relationship is shown typically between the limit time set for each frame, the period during which the image processor 250 performs image processing on each frame (image processing period), and a period (display period) in which the display processor 260 displays a display image corresponding to the image-processed image data of each frame on the display device 40.

More specifically, FIG. 3 shows the image processing period in the image processor 250 by combining an operation period in which the bus master 2501 performs read DMA transfer for acquiring (reading) preprocessed image data from the DRAM 30, an operation period in which the image processing module 2502 performs image processing on the preprocessed image data, and an operation period in which the bus master 2503 performs write DMA transfer for storing (writing) image-processed image data in the DRAM 30. In the example of the relationship between the limit time and the image processing period shown in FIG. 3, the operation period is shown in a case in which each of the surface buffer 2501B provided in the bus master 2501 and the surface buffer 2503B provided in the bus master 2503 has a double buffer configuration.

Also, in FIG. 3, a period during which the display processor 260 acquires (reads out) image-processed image data of each frame from the DRAM 30 to perform display processing and causes the display device 40 to display the display image is shown as a display period.

As shown in FIG. 3, the limit time in each frame is set to a timing at which the display processor 260 starts acquiring (reading out) image-processed image data from the DRAM 30. Then, the image processor 250 performs image processing so that the image processing is completed by the limit time set for each frame.

At this time, the priority switching control part 2504 calculates the processing margin time based on the remaining processing time calculated based on the image processing progress status signal PS output from the image processing module 2502, the limit time, and the current elapsed time. FIG. 3 also shows the processing margin time calculated by the priority switching control part 2504. Then, the priority switching control part 2504 determines the urgency of image processing performed by the image processing module 2502 based on the calculated processing margin time.

In the example shown in FIG. 3, the image processing of the image processor 250 in each frame is completed by the limit time set for each frame. However, as shown in FIG. 3, the image processing period during which the image processor 250 performs image processing differs for each frame. For example, in the example shown in FIG. 3, the image processing period of frame 2 is significantly longer than the image processing period of frame 1 or the image processing period of frame 3. In other words, in the example shown in FIG. 3, the processing margin time of frame 2 is significantly shorter than the processing margin time of frame 1 and the processing margin time of frame 3.

This is because the read DMA transfer by the bus master 2501 for acquiring (reading) the preprocessed image data of the frame 2 to be subjected to image processing from the DRAM 30 is awaited. In other words, this is because, since the bus arbiter 220 accepts (permits) an access request from another processing block having a higher priority than the image processor 250, it takes a long time before the access request from the bus master 2501 is accepted (permitted) by the bus arbiter 220.

When the priority switching control part 2504 determines that the processing margin time calculated for the frame 2 is shorter than the urgency threshold time in the process of step S130, it is determined that the urgency of the image processing performed by the image processing module 2502 is high. Based on the determined result, the priority switching control part 2504 generates a priority switching signal SW for notifying that the priority set in the image processor 250 is switched to a higher level, to output to the bus arbiter 220. Accordingly, when arbitrating access requests to the DRAM 30 from the respective processing blocks, the bus arbiter 220 switches the priority of the image processor 250 to a higher level in accordance with the priority switching signal SW, and accepts (permits) access requests from the image processor 250 with priority. More specifically, the bus arbiter 220 preferentially accepts (permits), for example, read DMA transfer by the bus master 2501 and write DMA transfer by the bus master 2503.

FIG. 3 shows an example of the urgency threshold time. Also, in FIG. 3, as an example of the priority switching signal SW output from the priority switching control part 2504 to the bus arbiter 220, in the image processing period of frame 2, a state in which the priority set in the image processor 250 is switched to a higher priority is shown. In FIG. 3, regarding the priority switching signal SW output from the priority switching control part 2504, the "High" level indicates that the priority of the image processor 250 is to be increased, and the "Low" level indicates that the priority of the image processor 250 is to be lowered (the priority is kept low).

Thus, in the example shown in FIG. 3, the write DMA transfer by the bus master 2503 is preferentially accepted (permitted) by the bus arbiter 220. In this case, the image processing period of frame 2 shown in FIG. 3 is shorter than the image processing period currently shown in FIG. 3. In other words, the processing margin time of frame 2 shown in FIG. 3 is longer than the processing margin time currently shown in FIG. 3.

As a result, in the example shown in FIG. 3, it is possible to reduce a factor that causes a failure in a series of image processing in the shooting mode in the imaging device 1 since the image processing of the frame 2 by the image processor 250 exceeds the limit time of the frame 2. That is, the image processor 250 can reliably complete the image processing of the frame 2 until the limit time of the frame 2, and the imaging device 1 can perform a series of image processing in the shooting mode without delay.

When the display processor 260 causes the display device 40 to display a display image corresponding to the image-processed image data for each frame, that is, the display processor 260 acquires (reads out) the image-processed image data for each frame from the DRAM 30, the limit time is set for each frame period as in the example shown in FIG. 3. However, when the display processor 260 does not display the display image corresponding to the image-processed image data of all frames on the display device 40, but displays the display image on the display device 40 at a timing once every plural times, that is, when the display image is displayed on the display device 40 by thinning out the frames, the limit time is set for each cycle of the thinned frames.

Next, another example of the concept of the limit time set by the image processing performed by the image processing module 2502 will be described. For example, consider a case where the operation mode of the imaging device 1 is a continuous shooting mode in which still images of a subject are continuously captured. In this case, it is necessary that the image processing module 2502 generates image-processed image data (still image data) at every so-called continuous shooting interval from the timing when the subject is photographed at a certain time to the timing when the subject is photographed next, and stores (writes) the data in the DRAM 30. Therefore, the limit time is set to a periodic time based on the interval at which the captured image reception part 240 stores (writes) the preprocessed image data in accordance with the pixel signal data output from the image sensor 10 in the DRAM 30.

Also in this case, the priority switching control part 2504 calculates the processing margin time based on the remaining processing time calculated based on the image processing progress status signal PS output from the image processing module 2502, the limit time, and the current elapsed time, and determines the urgency of the image processing performed by the image processing module 2502. Then, the priority switching control part 2504 outputs a priority switching signal SW based on the determined result to the bus arbiter 220, so that the image processor 250 can complete the image processing more reliably until the limit time, and the imaging device 1 can perform a series of image processing in the continuous shooting mode without delay.

The relationship between the limit time and the image processing period when the operation mode of the imaging device 1 is the continuous shooting mode can be considered in the same way as the example of the relationship between the limit time and the image processing period in the shooting mode shown in FIG. 3. More specifically, in the example of the relationship between the limit time and the image processing period shown in FIG. 3, it can be easily considered by replacing the timing at which the display processor 260 in which the limit time is set starts acquiring (reading) the image-processed image data from the DRAM 30 starts with the timing at which the captured image reception part 240 starts storing (writing) the preprocessed image data into the DRAM 30. Therefore, a detailed description of the relationship between the limit time and the image processing period when the operation mode of the imaging device 1 is the continuous shooting mode is omitted.

Subsequently, another example of the concept of the limit time set by the image processing performed by the image processing module 2502 will be described. For example, consider a case where the operation mode of the imaging device 1 is a video image mode in which a video image of a subject is captured. In this case, the image processing module 2502 needs to generate the image-processed image data (video image data) for a plurality of frames included in the group to store (write) in the DRAM 30 by the timing that a video image processor (not shown) that collectively converts (encodes) the image-processed image data of a plurality of frames into one group acquires (reads) image-processed image data of a plurality of frames stored in the DRAM 30. For this reason, the limit time is set as a periodic time based on a timing at which image-processed image data included in each group that is converted (encoded) by a video image processor (not shown), that is, image-processed image data in group units is acquired (read) from the DRAM 30.

Figure 4:
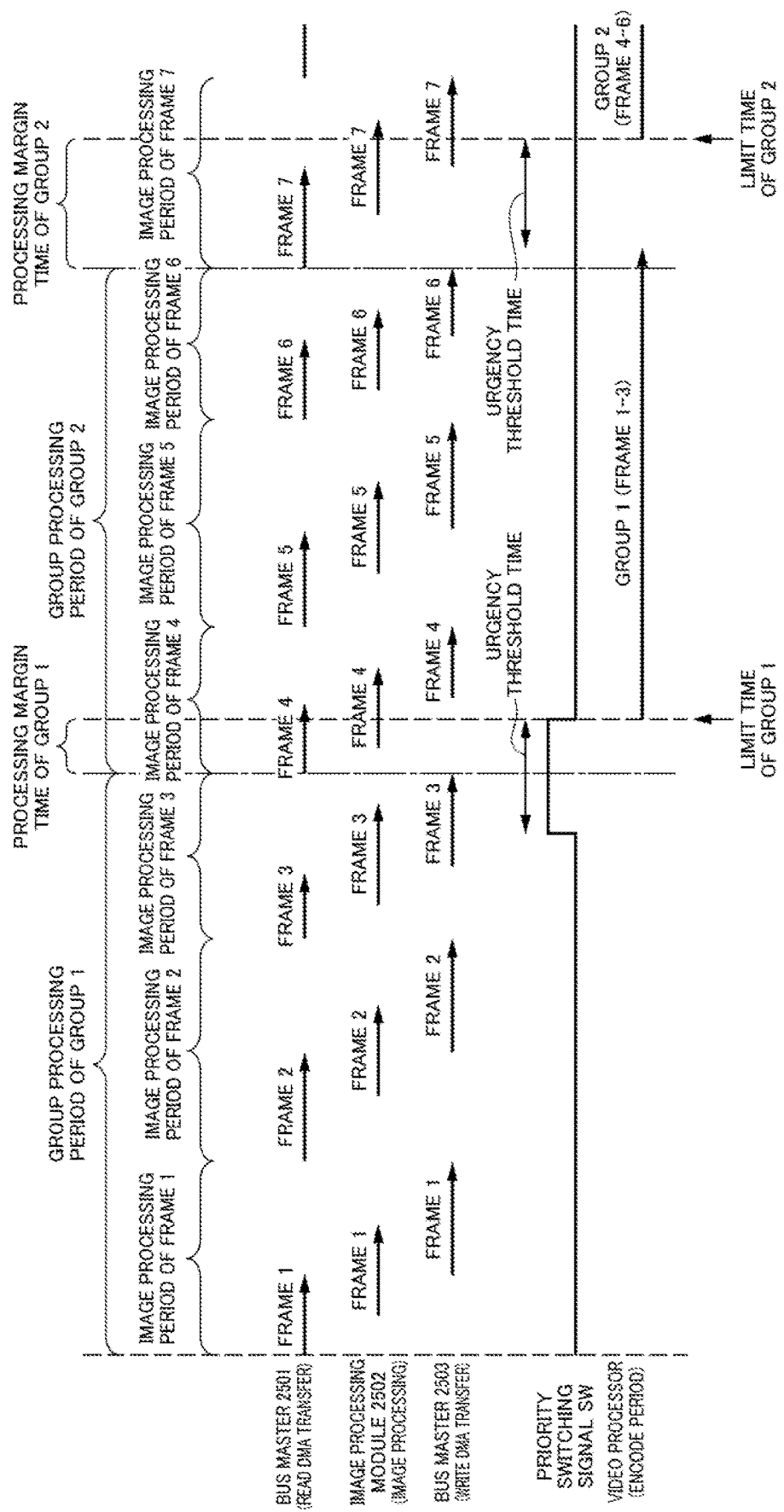
FIG. 4 is a diagram schematically showing another example of a relationship between a limit time and an image processing period in the memory access device according to the first embodiment of the present invention.

In this case, the relationship between the limit time and the period during which the image processor 250 performs image processing is as shown in FIG. 4. FIG. 4 is a diagram schematically showing another example of the relationship between the limit time and the image processing period in the memory access device according to the first embodiment of the present invention. FIG. 4 schematically shows an example of a relationship between a limit time set for each group, an image processing period in which the image processor 250 performs image processing on each frame, a period corresponding to the frame included in each group (group processing period), and a period (encoding period) in which a video image processor (not shown) collectively converts (encodes) image processed image data for a plurality of frames included in each group. An example of the relationship between the limit time and the image processing period in the video image mode shown in FIG. 4 is an example in which three frames are grouped into one group.

As in the example of the relationship between the limit time and the image processing period in the shooting mode shown in FIG. 3, FIG. 4 shows an image processing period in the image processor 250 in which an operation period of the read DMA transfer in the bus master 2501, an operation period of image processing in the image processing module 2502, and an operation period of write DMA transfer in bus master 2503 are combined. The example of the relationship between the limit time and the image processing period shown in FIG. 4 is the same as the example of the relationship between the limit time and the image processing period in the shooting mode shown in FIG. 3, and shows an operation period in which each of the surface buffer 2501B provided in the bus master 2501 and the surface buffer 2503B provided in the bus master 2503 has a double buffer configuration.

In FIG. 4, a period during which a video image processor (not shown) acquires (reads out) image-processed image data for a plurality of frames (3 frames) included in each group from the DRAM 30 and collectively converts (encodes) the data into one group is shown as an encoding period.

As shown in FIG. 4, the limit time in each group is set to a timing at which a video image processor (not shown) starts acquiring (reading) image-processed image data for a plurality of frames from the DRAM 30. Then, the image processor 250 performs image processing so that the image processing for three frames included in the group is completed by the limit time set for each group.

At this time, the priority switching control part 2504 calculates the processing margin time for each group based on the remaining processing time for each group calculated based on the image processing progress signal PS output from the image processing module 2502, the group limit time, and the current elapsed time. That is, the priority switching control part 2504 calculates the remaining processing time and the processing margin time in a unit in which three frames included in the group are collected. FIG. 4 also shows the processing margin time for each group calculated by the priority switching control part 2504. The priority switching control part 2504 determines the urgency of image processing performed by the image processing module 2502 in units of groups based on the calculated processing margin time in units of groups. For this reason, the priority switching control part 2504 determines the urgency of the image processing performed by the image processing module 2502 without considering the length of the image processing period in each frame in which the image processing module 2502 performs image processing shown in FIG. 4.

The priority switching control part 2504 may determine the urgency of image processing performed by the image processing module 2502 for each image processing period in each frame for which the image processing module 2502 performs image processing. In this case, similarly to the example of the relationship between the limit time and the image processing period in the shooting mode shown in FIG. 3, the priority switching control part 2504 calculates the processing margin time for each frame, and determines the urgency of image processing performed by the image processing module 2502.

Also in the example shown in FIG. 4, the image processing of the image processor 250 for the three frames included in each group is completed by the limit time set for each group. However, in the example shown in FIG. 4 as well, as in the example shown in FIG. 3, the image processing period in which the image processor 250 performs image processing differs for each frame. The reason is the same as the example of the relationship between the limit time and the image processing period in the shooting mode shown in FIG. 3. For this reason, as shown in FIG. 4, the group processing period of each group is different for each group. For example, in the example shown in FIG. 4, the group processing period of group 1 is significantly longer than the group processing period of group 2. In other words, in the example shown in FIG. 4, the processing margin time for group 1 is significantly shorter than the processing margin time for group 2. In this way, a state in which the processing margin time of the group is shortened may occur when the image processing period of any frame included in the same group is significantly longer than the image processing period of other frames, or when the image processing period of each frame included in the same group becomes longer overall.

When determining that the processing margin time calculated for the group 1 is shorter than the urgency threshold time in the process of step S130, the priority switching control part 2504 determines that the urgency of image processing that the image processing module 2502 performs on each frame included in the group 1 is high. Based on the determined result, the priority switching control part 2504 generates a priority switching signal SW for notifying that the priority set in the image processor 250 is switched to a higher level to output to the bus arbiter 220. Accordingly, when arbitrating access requests to the DRAM 30 from the respective processing blocks, the bus arbiter 220 switches the priority of the image processor 250 to a higher level in accordance with the priority switching signal SW, and accepts (permits) access requests from the image processor 250 with priority. More specifically, for example, the bus arbiter 220 preferentially accepts (permits) a read DMA transfer by the bus master 2501 or a write DMA transfer by the bus master 2503 after the priority switching signal SW notifying that the priority set in the image processor 250 is switched to a higher level is output to the bus arbiter 220.

FIG. 4 shows an example of the urgency threshold time. In FIG. 4, as an example of the priority switching signal SW output from the priority switching control part 2504 to the bus arbiter 220, a state in which the priority set in the image processor 250 is switched to a higher level in the image processing period of frame 3 included in the group 1 is shown. Also in FIG. 4, the level represented by the priority switching signal SW is the same as the example shown in FIG. 3.

Accordingly, in the example shown in FIG. 4, the write DMA transfer by the bus master 2503 after the priority switching signal SW notifying that the priority set in the image processor 250 is switched to be higher is output to the bus arbiter 220 is accepted (permitted) by the bus arbiter 220 with priority. In this case, the group processing period of group 1 shown in FIG. 4 is shorter than the group processing period currently shown in FIG. 4. In other words, the processing margin time of group 1 shown in FIG. 4 is longer than the processing margin time currently shown in FIG. 4.

Accordingly, in the example shown in FIG. 4, it is possible to reduce a factor that causes delay of the completion of the image processing for each frame that is performed by the image processor 250 after the priority switching signal SW for notifying that the priority of the image processor 250 is switched to a higher priority is output, exceed of the limit time set for the group 1, and a failure in a series of image processing in the video image mode in the imaging device 1 in the group 1. That is, the image processor 250 can reliably complete the image processing of each frame included in the group 1 until the limit time of the group 1, and the imaging device 1 can perform a series of image processing in the video image mode without delay.

With such a configuration and operation, in the memory access device according to the first embodiment, the priority switching control part 2504 calculates the remaining processing time by the calculation methods as shown in the first calculation method to the fourth calculation method, using the image processing progress status signal PS output from the image processing module 2502 in the process of step S110. In the memory access device according to the first embodiment, in the process of step S120, the priority switching control part 2504 calculates the processing margin time by the above equation (7), using the limit time set based on the concept according to the image processing performed by the image processing module 2502, the current elapsed time, and the calculated remaining processing time. In the memory access device according to the first embodiment, in the process of step S130, the priority switching control part 2504 determines the urgency of the image processing performed by the image processing module 2502 by comparing the calculated margin time with the urgency threshold time, and outputs a priority switching signal SW for notifying the urgency of the image processing performed by the image processor 250 to the bus arbiter 220 based on the determination result.

More specifically, in the memory access device according to the first embodiment, when determining that the calculated processing margin time is not shorter than the urgency threshold time (the processing margin time is equal to or greater than the urgency threshold time), the priority switching control part 2504 outputs a priority switching signal SW indicating that the urgency of the image processing performed by the image processor 250 is low to the bus arbiter 220. Also, in the memory access device according to the first embodiment, when it is determined that the calculated processing margin time is shorter than the urgent threshold time, the priority switching control part 2504 outputs a priority switching signal SW indicating that the urgency of the image processing performed by the image processor 250 is high to the bus arbiter 220.

In the memory access device according to the first embodiment, the priority switching signal SW is a signal for requesting switching (change) of the priority of DMA transfer in the image processor 250 as described above. At this time, in the memory access device according to the first embodiment, the priority switching control part 2504 determines the urgency of the image processing performed by the image processing module 2502 before the image processing performed by the image processor 250 is stopped due to a waiting state, and outputs the priority switching signal SW to the bus arbiter 220 at an early timing. That is, in the memory access device according to the first embodiment, the priority switching control part 2504 outputs the priority switching signal SW in a state where there is a certain margin in the image processing period of the image processor 250, and requests the bus arbiter 220 to switch (change) the priority of the image processor 250.

Thereby, in the memory access device according to the first embodiment, when arbitrating an access request to the DRAM 30 from each processing block, the bus arbiter 220 determines a processing block that accepts (permits) an access request to the DRAM 30 in a state where the priority of the image processor 250 is switched according to the priority switching signal SW output from the priority switching control part 2504. More specifically, in the memory access device according to the first embodiment, when the priority switching signal SW output from the priority switching control part 2504 indicates that the priority of the image processor 250 is low, the bus arbiter 220 accepts (permits) an access request to the DRAM 30 from the captured image capturing part 240 or the display processor 260 set to a higher priority. On the other hand, in the memory access device according to the first embodiment, when the priority switching signal SW output from the priority switching control part 2504 indicates that the priority of the image processor 250 is high, the bus arbiter 220 accepts (permits) an access request to the DRAM 30 from the image processor 250 switched to a higher priority.

Thereby, in the memory access device according to the first embodiment, the completion of image processing for each frame by the image processor 250 is delayed and the set limit time is not exceeded. As a result, in the memory access device according to the first embodiment, it is possible to reduce a factor that causes a failure in a series of image processing in a system (the imaging device 1 or the image processing device 20) in which the memory access device according to the first embodiment is mounted. That is, in the memory access device according to the first embodiment, the image processing of each frame in the image processor 250 can be reliably completed by the set limit time, and a series of image processing in a system (the imaging device 1 or the image processing device 20) equipped with the memory access device according to the first embodiment can be performed without delay.

In the first embodiment, several concepts for setting a limit time according to image processing performed by the image processing module 2502 have been described. However, in the memory access device according to the first embodiment, the concept of the limit time set according to the image processing performed by the image processing module 2502 is not limited to the concept described above. That is, as the concept of the limit time set in the memory access device according to the first embodiment, any concept can be used as long as the priority switching control part 2504 controls to increase the priority so that the access request output by the image processor 250 is accepted (permitted) by the bus arbiter 220 before a waiting state occurs the image processing performed by the image processor 250 is stopped.

According to the first embodiment, a memory access device is configured including the following. A data processor (image processing module 2502) outputs an access request for requesting access to the memory (DRAM 30) connected to the data bus 210, performs data processing (image processing) on the accessed data of the DRAM 30 (for example, preprocessed image data), and notifies the progress status of data processing (image processing) (outputs an image processing progress signal PS). A priority switching control part 2504 determines the urgency of the data processing (image processing) by the image processing module 2502 based on the progress status of the data processing (image processing) notified from the image processing module 2502 (the output image processing progress signal PS), and outputs a priority switching signal SW for notifying the priority switching of the image processing module 2502. A bus arbiter 220 connected to the data bus 210 arbitrates by changing the priority of the access request output from the image processing module 2502 according to the priority switching signal SW when arbitrating the access request to the DRAM 30, and controls access to DRAM 30 in response to the access request accepted by the arbitration.

Further, according to the first embodiment, the memory access device is configured as follows. The priority switching control part 2504 calculates the remaining processing time in the data processing (image processing) performed by the image processing module 2502 based on the progress status of the data processing (image processing) notified from the image processing module 2502 (the output image processing progress status signal PS), calculates the processing margin time when the image processing module 2502 performs data processing (image processing) based on the remaining processing time, a limit time defined as a time time required for the image processing module 2502 to complete the data processing (image processing), and the processing time (current elapsed time) from the start of data processing (image processing) by the image processing module 2502 to the current time, and determines the urgency of the data processing (image processing) by the image processing module 2502 based on the processing margin time and a predetermined urgency threshold time.

Further, according to the first embodiment, the memory access device is configured as follows. When the processing margin time is shorter than a predetermined urgency threshold time, the priority switching control part 2504 determines that the urgency of data processing (image processing) by the image processing module 2502 is high, and outputs a priority switching signal SW for notifying that the priority of the image processing module 2502 is to be increased. When the processing margin time is not shorter than the emergency threshold time, the priority switching control part 2504 determines that the urgency of the data processing (image processing) by the image processing module 2502 is low, and outputs a priority switching signal SW for notifying that the priority of the image processing module 2502 remains low. When arbitrating the access request to the DRAM 30, the bus arbiter 220 arbitrates by increasing the priority of the access request output from the image processing module 2502 that has been notified that the priority has been increased by the priority switching signal SW.

Further, according to the first embodiment, the memory access device is configured as follows. The image processing module 2502 notifies, as the progress status of the data processing (image processing) (image processing progress signal PS to be output), a processing completion rate indicating the rate of completion of the data processing (image processing). The priority switching control part 2504 calculates the remaining processing time based on the speed (processing speed) of data processing (image processing) and the amount of processing (total number of output pixels) in the image processing module 2502, and the notified processing completion rate.

Further, according to the first embodiment, the memory access device is configured as follows. When performing the data processing (image processing) in a plurality of times (when an area of an image of one frame is divided into a plurality of rectangular blocks including preprocessed image data of the same number of pixels, and image processing is performed for each of the divided blocks), the image processing module 2502 notifies the number of processing completion (the number of processing completion blocks) indicating the number of times the data processing (image processing) has been completed, as the progress status of the data processing (image processing) (image processing progress signal PS to be output), and the priority switching control part 2504 calculates the remaining processing time based on the number of remaining data (the number of blocks) acquired from the number of data processing (image processing) (total number of blocks) performed by the image processing module 2502 and the notified number of processing completions, the amount of processing (the number of pixels in one block) in one data processing (image processing) performed separately, and speed (processing speed) of data processing (image processing) in the image processing module 2502.

Further, according to the first embodiment, the memory access device is configured as follows. When data processing (image processing) is performed a plurality of times with different processing amounts (in a case in which the number of pixels included in each block is different when dividing the area of an image of one frame into a plurality of blocks and performing image processing), the image processing module 2502 notifies a processing completion amount (current number of input pixels) indicating the amount of processing for which data processing (image processing) has been completed up to the current time as the progress status of data processing (image processing) (image processing progress signal PS to be output), and the priority switching control part 2504 calculates the remaining processing time based on the amount of remaining processing (the number of remaining input pixels) acquired from the total processing amount (the total number of input pixels) in the data processing (image processing) performed by the image processing module 2502 and the notified processing completion amount (the current number of input pixels), and speed (processing speed) of data processing (image processing) in the image processing module 2502.

In addition, according to the first embodiment, the memory access device is configured as follows. The priority switching control part 2504 multiplies one or both of the remaining processing time and the limit time by a predetermined time coefficient expressed as a ratio to the time, and then calculates the processing margin time.

Further, according to the first embodiment, an image processing device 20 is configured including a memory access device including the following. A data processor (image processing module 2502) outputs an access request for requesting access to the memory (DRAM 30) connected to the data bus (data bus 210), performs data processing (image processing) on the accessed data (for example, preprocessed image data) of the DRAM 30, and notifies the progress status of the data processing (image processing) (outputs the image processing progress signal PS). A priority switching control part 2504 determines the degree of urgency of data processing (image processing) by the image processing module 2502 based on the progress status of the data processing (image processing) notified from the image processing module 2502 (the output image processing progress signal PS), and outputs a priority switching signal SW for notifying the switching of the priority of the image processing module 2502. A bus arbiter 220 connected to the data bus 210 changes the priority of the access request output from the image processing module 2502 according to the priority switching signal SW to perform arbitration when arbitrating the access request to the DRAM 30, and controls access to the DRAM 30 in response to the access request accepted by the arbitration.

Further, according to the first embodiment, an imaging device 1 is configured including an image processing device 20 including a memory access device including the following. A data processor (image processing module 2502) outputs an access request for requesting access to the memory (DRAM 30) connected to the data bus (data bus 210), performs data processing (image processing) on the accessed data (for example, preprocessed image data) of the DRAM 30, and notifies the progress status of the data processing (image processing) (outputs the image processing progress signal PS). A priority switching control part 2504 determines the degree of urgency of data processing (image processing) by the image processing module 2502 based on the progress status of the data processing (image processing) notified from the image processing module 2502 (the output image processing progress signal PS), and outputs a priority switching signal SW for notifying the switching of the priority of the image processing module 2502. A bus arbiter 220 connected to the data bus 210 changes the priority of the access request output from the image processing module 2502 according to the priority switching signal SW to perform arbitration when arbitrating the access request to the DRAM 30, and controls access to the DRAM 30 in response to the access request accepted by the arbitration.

As described above, in the memory access device according to the first embodiment, the image processing module 2502 in the image processor 250 notifies the priority switching control part 2504 of the progress status of the image processing being executed by the image processing progress signal PS. In the memory access device according to the first embodiment, the priority switching control part 2504 in the image processor 250 calculates the remaining processing time using the image processing progress status signal PS output from the image processing module 2502, and calculates a processing margin time using the set limit time, the current elapsed time, and the calculated remaining processing time. Then, in the memory access device according to the first embodiment, the priority switching control part 2504 in the image processor 250 compares the calculated processing margin time with the urgency threshold time, thereby determining the urgency of the image processing performed by the image processing module 2502, and outputs to the bus arbiter 220 a priority switching signal SW for notifying the urgency of the image processing performed by the image processor 250.

Thus, in the memory access device according to the first embodiment, the priority switching control part 2504 in the image processor 250 can request the bus arbiter 220 to switch (change) the priority of the image processor 250. In the memory access device according to the first embodiment, when arbitrating an access request to the DRAM 30 from each processing block, the bus arbiter 220 determines a processing block that accepts (permits) an access request to the DRAM 30 in a state where the priority of the image processor 250 is switched according to the priority switching signal SW output from the priority switching control part 2504. In other words, in the memory access device according to the first embodiment, before the completion of the image processing for each frame by the image processor 250 is delayed and exceeds the set limit time, an access request to the DRAM 30 from the image processor 250 is accepted (permitted).

As a result, in the system (imaging device 1 or image processing device 20) in which the memory access device according to the first embodiment is mounted, the factors that cause a series of image processing failures are reduced, and the image processing of each frame in the image processor 250 can be reliably completed by the set limit time. As a result, in the system (the imaging device 1 or the image processing device 20) in which the memory access device according to the first embodiment is mounted, a series of image processing to be realized can be smoothly performed without any delay without causing a failure in operation and functions of the system In the memory access device according to the first embodiment, a configuration in which the image processing device 20 includes one image processor 250, the urgency of the image processing performed by the image processor 250 is determined, and the priority switching signal SW is output to the bus arbiter 220 has been described. That is, in the memory access device according to the first embodiment, a case in which one type of image processing function is provided, the urgency when executing this image processing function is determined, and switch (change) of the priority is requested to the bus arbiter 220 has been described. However, the type of image processing performed in a system equipped with the memory access device of the present invention is not limited to one type of image processing shown in the memory access device according to the first embodiment. For example, a plurality of types of image processing may be implemented in a system equipped with the memory access device of the present invention. In this case, the memory access device of the present invention may be configured to perform a plurality of types of image processing in a system equipped with the memory access device of the present invention by including a plurality of image processors 250.

Second Embodiment

Next, a memory access device according to a second embodiment of the present invention will be described. The memory access device according to the second embodiment of the present invention includes a plurality of image processors constituting the memory access device. Also in the following description, a case will be described in which the memory access device according to the second embodiment of the present invention is provided in an image processing device mounted on an imaging device such as a still image camera or a video camera, for example.

Figure 5:
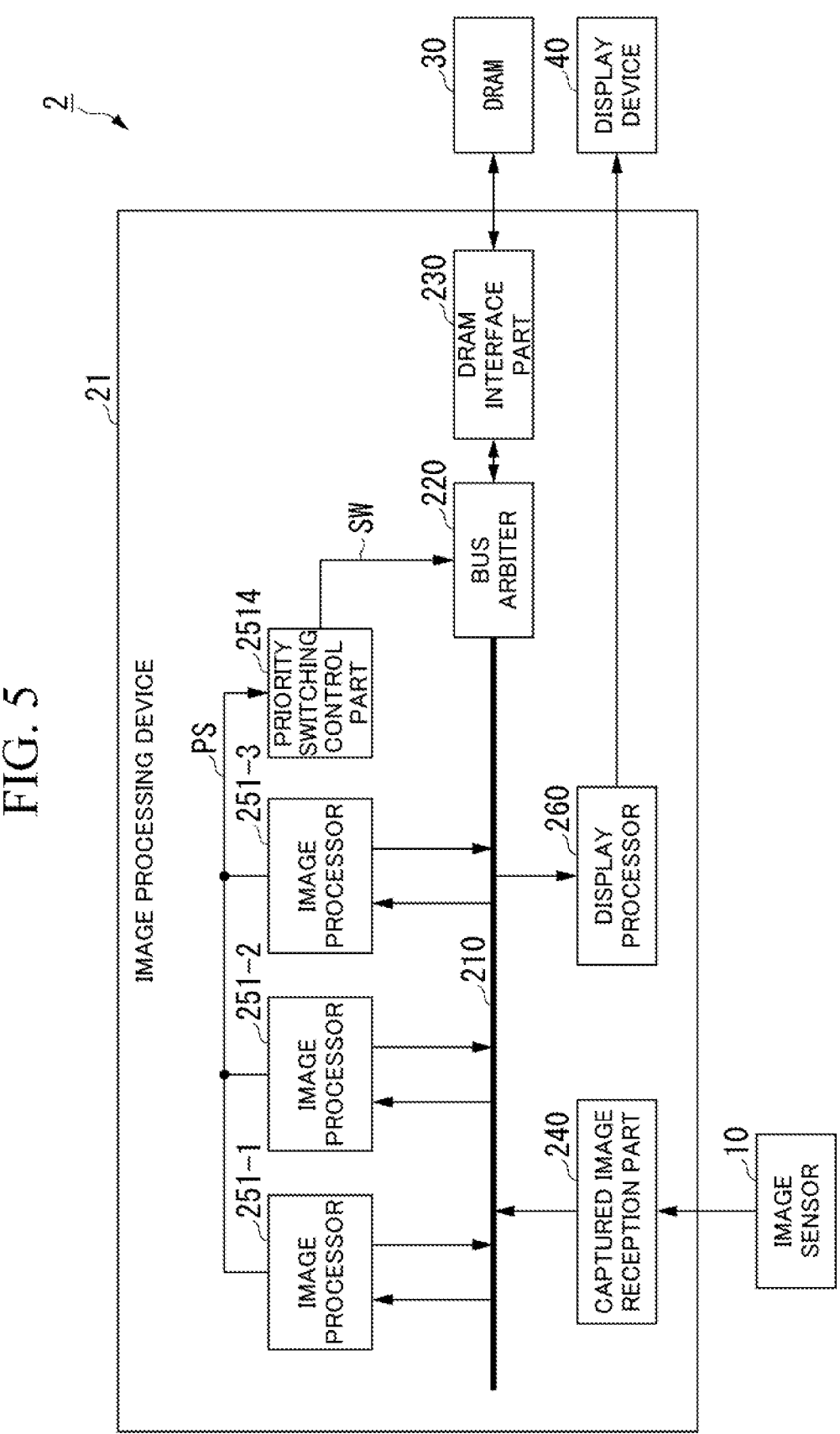
FIG. 5 is a block diagram showing a schematic configuration of an imaging device equipped with an image processing device including a memory access device according to a second embodiment of the present invention.

FIG. 5 is a block diagram showing a schematic configuration of an imaging device equipped with an image processing device including a memory access device according to the second embodiment of the present invention. The configuration of the imaging device equipped with the image processing device provided with the memory access device according to the second embodiment shown in FIG. 5 includes the same constituent elements as those of the imaging device 1 equipped with the image processing device 20 including the memory access device according to the first embodiment shown in FIG. 1. Therefore, in the constituent elements of the imaging device equipped with the image processing device equipped with the memory access device according to the second embodiment, the same components as those of the imaging device 1 equipped with the image processing device 20 having the memory access device according to the first embodiment are denoted by the same reference numerals, and detailed description of each component is omitted. Although some components are not shown in FIG. 5, the configuration of the image processing device including the memory access device according to the second embodiment includes the same components as those of the image processing device 20 including the memory access device according to the first embodiment shown in FIG. 1. Accordingly, in the components of the image processing device including the memory access device according to the second embodiment, the same components as those of the image processing device 20 including the memory access device according to the first embodiment are denoted by the same reference numerals, and detailed description of each component will be omitted. In the components of the image processing device having the memory access device according to the second embodiment, components similar to those of the image processing device 20 including the memory access device according to the first embodiment, which are not shown in FIG. 5, are described using the same reference numerals.

The imaging device 2 shown in FIG. 5 includes an image sensor 10, an image processing device 21, a DRAM 30, and a display device 40. The image processing device 21 includes a bus arbiter 220, a DRAM interface part 230, a captured image reception part 240, three image processors 251-1 to 251-3, a priority switching control part 2514, and a display processor 260. In the image processing device 21, the bus arbiter 220, the captured image reception part 240, the three image processors 251-1 to 251-3, and the display processor 260 are connected to the common data bus 210.

In the imaging device 2 shown in FIG. 5, the memory access device according to the second embodiment is configured by the three image processors 251-1 to 251-3 provided in the image processing device 21, the priority switching control part 2514, and the bus arbiter 220.

In the following description, when the three image processors 251-1 to 251-3 are not distinguished from each other, they are simply referred to as "image processor 251".

Similarly to the imaging device 1 in the first embodiment shown in FIG. 1, the imaging device 2 also captures a still image or a video image of a subject with the image sensor 10, and displays a display image corresponding to the captured still image or video image on the display device 40. Similarly to the imaging device 1 in the first embodiment, the imaging device 2 can also record a record image corresponding to a captured still image or video image on a recording medium (not shown).

Similar to the image processing device 20 in the first embodiment shown in FIG. 1, the image processing device 21 performs predetermined image processing on the pixel signal output from the image sensor 10 to generate a still image or a video image. Further, similarly to the image processing device 20 in the first embodiment, the image processing device 21 generates a display image corresponding to the generated still image or video image, and causes the display device 40 to display the generated display image. Similar to the image processing device 20 in the first embodiment, the image processing device 21 can also generate a record image corresponding to the generated still image or video image, and record the generated record image on a recording medium (not shown).

In the image processing device 21, each of the captured image reception part 240, the three image processors 251-1 to 251-3, and the display processor 260 is a processing block that realizes an image processing function performed in the image processing device 21. In the image processing device 21, the captured image reception part 240, the three image processors 251-1 to 251-3, and the display processor 260 each access the DRAM 30 by DMA transfer via the data bus 210.

Similar to the image processing device 20 in the first embodiment, in the image processing device 21 as well, a priority indicating the priority of DMA transfer when accessing the DRAM 30 when executing the image processing is set in each processing block. This priority is also set for each operation mode of the imaging device 2 as in the image processing device 20 in the first embodiment.

In the following description, like the image processing device 20 in the first embodiment, each of the captured image reception part 240 and the display processor 260 provided in the image processing device 21 will be described as a processing block set to have a high priority. That is, the three image processors 251-1 to 251-3 provided in the image processing device 21 will be described as processing blocks having low priority.

The bus arbiter 220 arbitrates an access request (DMA request) to the DRAM 30 by DMA transfer from each processing block in the image processing device 21 connected to the data bus 210 based on the priority of each processing block. Then, data is transferred via the data bus 210 with the processing block that has received the access request.

Similar to the image processor 250 provided in the image processing device 20 in the first embodiment, each of the image processors 251-1 to 251-3 is a processing block for performing predetermined image processing on image data stored in the DRAM 30. Therefore, the image processors 251-1 to 251-3 also perform DMA transfer (read DMA transfer) for acquiring (reading) image data to be subjected to image processing, and DMA transfer (write DMA transfer) for storing (writing) image data generated by performing image processing in the DRAM 30. Accordingly, each of the image processors 251-1 to 251-3 includes a bus master 2501, an image processing module 2502, and a bus master 2503, as in the image processor 250 in the image processing device 20 according to the first embodiment.

Each of the image processors 251-1 to 251-3 does not include the priority switching control part 2504, which was provided in the image processor 250 in the image processing device 20 in the first embodiment. Instead, the image processing device 21 includes the priority switching control part 2514 as described above. That is, the image processing device 21 includes, instead of the priority switching control part 2504 provided in the image processor 250 in the first embodiment, one priority switching control part 2514 common to each of the image processors 251-1 to 251-3.

In the image processing device 21, each of the image processors 251-1 to 251-3 sequentially performs predetermined image processing on the image data stored in the DRAM 30. Accordingly, the image data that each of the image processors 251-1 to 251-3 acquires (reads out) from the DRAM 30 by read DMA transfer is not limited to preprocessed image data.

More specifically, first, the image processor 251-1 performs predetermined image processing on the preprocessed image data stored in the DRAM 30, and stores (writes) it in the DRAM 30 again. Subsequently, the image processor 251-2 performs predetermined image processing on the image data stored (written) by the image processor 251-1 stored in the DRAM 30, and stores (writes) the data in the DRAM 30 again. Finally, the image processor 251-3 performs predetermined image processing on the image data stored (written) by the image processor 251-2 stored in the DRAM 30 and stores (writes) the data in the DRAM 30 again. As described above, in the image processing device 21, three types of image processing are sequentially performed on the preprocessed image data stored in the DRAM 30 by each of the image processors 251-1 to 251-3.

Each of the bus master 2501, the image processing module 2502, and the bus master 2503 provided in the image processor 251 is the same as each of the bus master 2501, the image processing module 2502, and the bus master 2503 provided in the image processor 250 in the first embodiment. Therefore, detailed description of each of the bus master 2501, the image processing module 2502, and the bus master 2503 provided in the image processor 251 is omitted. However, as described above, in the image processing device 21, the image processor 251-1 to the image processor 251-3 sequentially perform three types of image processing on the preprocessed image data stored in the DRAM 30. Therefore, the image processing module 2502 provided in each of the image processors 251-1 to 251-3 realizes different image processing functions.

In the following description, when the image processing modules 2502 provided in each of the image processors 251-1 to 251-3 are distinguished, following the sign of the image processing module 2502, "-" given to each of the image processors 251 and a number following the sign are given. More specifically, the image processing module 2502 provided in the image processor 251-1 is represented as "image processing module 2502-1". Further, the image processing module 2502 provided in the image processor 251-2 is represented as "image processing module 2502-2". Further, the image processing module 2502 provided in the image processor 251-3 is represented as "image processing module 2502-3".

In the image processing device 21 shown in FIG. 5, the image processing progress status signal PS output from the image processing module 2502 provided in each of the image processors 251-1 to 251-3 is collectively shown. However, the image processing progress status signal PS is a signal for notifying the progress status of the image processing performed in the image processing module 2502 provided in each of the image processors 251-1 to 251-3. Therefore, in the following description, when distinguishing the image processing progress signal PS output to notify the progress status of the image processing performed by the image processing module 2502 provided in each of the image processors 251-1 to 251-3, following the signal name of the image processing progress signal PS, "-" given to each of the image processors 251 and a number following the symbol are given. More specifically, the image processing progress status signal PS output by the image processing module 2502-1 provided in the image processor 251-1 is represented as "image processing progress status signal PS-1". Further, the image processing progress status signal PS output from the image processing module 2502-2 provided in the image processor 251-2 is represented as "image processing progress status signal PS-2". Further, the image processing progress status signal PS output from the image processing module 2502-3 provided in the image processor 251-3 is represented as "image processing progress status signal PS-3".

Similar to the priority switching control part 2504 provided in the image processor 250 in the first embodiment, the priority switching control part 2514 notifies the priority of DMA transfer of the image processor 251, which the bus arbiter 220 considers when arbitrating the access request to the DRAM 30 from each processing block, to the bus arbiter 220.

More specifically, similar to the priority switching control part 2504 in the first embodiment, the priority switching control part 2514 also calculates the remaining processing time when the image processor 251 performs the image processing, based on the image processing progress signal PS output from the image processing module 2502 provided in the image processor 251. Similar to the priority switching control part 2504 in the first embodiment, the priority switching control part 2514 also determines the urgency of the image processing performed by the image processor 251, based on the calculated remaining processing time, the limit time for image processing defined as a time during which the image processor 251 needs to complete image processing for one frame, and the current elapsed time. Then, similar to the priority switching control part 2504 in the first embodiment, the priority switching control part 2514 also generates a priority switching signal SW for notifying the urgency of the image processing performed by the image processor 251 based on the determination result, and outputs the signal to the bus arbiter 220.

Similar to the priority switching signal SW output from the priority switching control part 2504 in the first embodiment, the priority switching signal SW output from the priority switching control part 2514 also notifies that arbitration is desired in a state where the priority of the image processor 251 is high, that is, DMA transfer (read DMA transfer or write DMA transfer) in the image processor 251 is to be urgently accepted (permitted). That is, similar to the priority switching signal SW output from the priority switching control part 2504 in the first embodiment, the priority switching signal SW output from the priority switching control part 2514 is also a signal for requesting switching (change) of the priority of DMA transfer in the image processor 251.

Similarly to the priority switching control part 2504 in the first embodiment, the parameter used by the priority switching control part 2514 to determine the priority of DMA transfer of the image processor 251, that is, the parameter used to determine the urgency of image processing performed by the image processing module 2502 is also set in a register of the priority switching control part 2514 by, for example, a CPU (not shown) provided in the image processing device 21.

In the image processing device 21, each of the image processing progress status signals PS-1 to PS-3 are respectively output to the priority switching control part 2514 from each of the image processors 251-1 to 251-3. Therefore, the priority switching control part 2514 calculates the remaining processing time for each image processor 251, based on the respective image processing progress status signals PS-1 to PS-3 output from each of the image processors 251-1 to 251-3, respectively. Then, the priority switching control part 2514 calculates a processing margin time based on the remaining processing time, the limit time, and the current elapsed time calculated for each image processor 251, and determines the urgency of image processing to be performed by each image processor 251. At this time, the priority switching control part 2514 determines the urgency of image processing for each unit of a series of image processing sequentially performed by each of the image processors 251-1 to 251-3 or for each image processor 251 according to the set limit time.

The method that the priority switching control part 2514 determines the urgency of image processing performed by each image processor 251 is the same as the method that the priority switching control part 2504 determines the urgency of image processing performed by the image processor 250 in the first embodiment shown in FIG. 2. Therefore, a detailed description of the method that the priority switching control part 2514 determines the urgency of image processing performed by each image processor 251 is omitted. However, as described above, the priority switching control part 2514 determines the urgency of image processing for each unit of a series of image processing sequentially performed by each of the image processors 251-1 to 251-3 or for each image processor 251 according to the set limit time, so the concept of setting the limit time and the method of determining the urgency of image processing according to the set limit time will be described later.

Then, the priority switching control part 2514 generates a priority switching signal SW for notifying the switching of the priority set in each image processor 251 based on the determined result, and outputs the priority switching signal SW to the bus arbiter 220. At this time, the priority switching control part 2514 generates a priority switching signal SW corresponding to each of the image processors 251-1 to 251-3 and outputs the priority switching signal SW to the bus arbiter 220. As a result, when arbitrating an access request to the DRAM 30 from each processing block, the bus arbiter 220 switches the priority of one of the image processors 251 to a higher level based on the priority switching signal SW, and preferentially accepts (permits) the access request from the image processor 251 whose priority has been switched to high. Accordingly, each image processor 251 can complete the image processing by the prescribed limit time of the image processing without causing a waiting state in the image processing to be performed and stopping.

Similar to the priority switching control part 2504 in the first embodiment, the priority switching control part 2514 may also notify the information as to which of the bus masters among the access request of the read DMA transfer from the bus master 2501 provided in the image processor 251 and the access request of the write DMA transfer from the bus master 2503 has higher priority as the priority switching signal SW. In other words, the priority switching control part 2514 may control the order of priority DMA transfer according to the progress status of a series of image processing sequentially performed by each of the image processors 251-1 to 251-3 in the image processing device 21 so that the image processing completes smoothly without delay.

With such a configuration, the imaging device 2 captures a still image or a video image of the subject by the image sensor 10 and causes the display device 40 to display a display image corresponding to the captured still image or video image. The imaging device 2 can also record a record image corresponding to a still image or a video image captured by the image sensor 10 on a recording medium (not shown).

Further, in the imaging device 2, the memory access device according to the second embodiment is configured by the three image processors 251-1 to 251-3 provided in the image processing device 21, the priority switching control part 2514, and the bus arbiter 220. In other words, in the image processing device 21, the memory access device according to the second embodiment is configured by the three image processors 251-1 to 251-3, which are processing blocks with lower priority among the processing blocks that transfer image data to and from the DRAM 30, combined with the priority switching control part 2514 and the bus arbiter 220.

In the memory access device according to the second embodiment, each of the image processors 251-1 to 251-3 outputs an image processing progress status signals PS-1 to PS-3 for notifying the progress status of the image processing being performed, to the priority switching control part 2514. In the memory access device according to the second embodiment, each of the priority switching control parts 2514 determines the urgency of image processing performed by the image processing module 2502 provided in the image processor 251 based on the image processing progress status indicated by the image processing progress status signal PS output from each image processor 251, and outputs a priority switching signal SW for notifying the priority of DMA transfer in the image processor 251 to the bus arbiter 220.

Thereby, in the memory access device according to the second embodiment, in a case of accepting (permitting) an access request from each processing block, when the priority switching signal SW indicates that the urgency of the image processing to be executed in any of the image processors 251 is high, the bus arbiter 220 switches the priority of the image processor 251 to a higher priority, and accepts (allows) the access request from the image processor 251 that has switched the priority to the higher priority. As a result, each image processor 251 (more specifically, the image processing module 2502) can complete the image processing by the specified limit time of the image processing without stopping the image processing to be performed. As a result, in the system (imaging device 2 or image processing device 21) in which the memory access device according to the second embodiment is mounted, a series of image processing on image data can be performed smoothly without delay, without stopping the operation of each image processor 251 (image processing module 2502), which may cause a failure in the operation or function of the system.

Next, an example of the operation of the memory access device according to the second embodiment will be described. As described above, in the image processing device 21 constituting the memory access device according to the second embodiment, each of the image processors 251-1 to 251-3 sequentially performs image processing on image data stored in the DRAM 30. In the following description, it is assumed that image processing is performed in the order of the image processor 251-1, the image processor 251-2, and the image processor 251-3. That is, the image processing device 21 will be described assuming that three types of image processing by the image processors 251-1 to 251-3 are performed as a series of image processing.

In an image processing device including a plurality of image processors, each image processor sequentially performs image processing on image data for one frame, thereby completing a series of image processing. However, in this case, the time required for a series of image processing performed in the image processing device becomes long. That is, a delay time (so-called latency) from input of image data for one frame to be subjected to image processing to output of final image data of one frame subjected to a series of image processing becomes long.

For example, in the image processing device 21, consider a case where each of the image processors 251-1 to 251-3 completes a series of image processing by sequentially performing image processing on image data for one frame.

In this case, in the image processing device 21, the time required for a series of image processing from when the image processor 251-1 acquires (reads) one frame of preprocessed image data from the DRAM 30 to when each image processor 251 performs image processing and the image processor 251-3 stores (writes) one frame of image processed image data in the DRAM 30 becomes longer. This is because, when each image processor 251 sequentially performs image processing on image data for one frame, the image processor 251 in the subsequent stage cannot perform image processing during the period in which the image processor 251 in the preceding stage performs image processing.

More specifically, during the period in which the first-stage image processor 251-1 performs image processing on the preprocessed image data for one frame, the second-stage image processor 251-2 and the third-stage image processor 251-3 cannot perform image processing. Further, during the period in which the second-stage image processor 251-2 performs image processing on preprocessed image data for one frame, the third-stage image processor 251-3 cannot perform image processing. Therefore, the time (delay time) required to complete a series of image processing in the image processing device 21 is the sum of the time required for image processing in the first-stage image processor 251-1, the time required for image processing in the second-stage image processor 251-2, and the time required for image processing in the third-stage image processor 251-3.

As described above, in an image processing device including a plurality of image processors, when each image processor sequentially performs image processing on image data for one frame, the time required for a series of image processings becomes longer.

Figure 6:
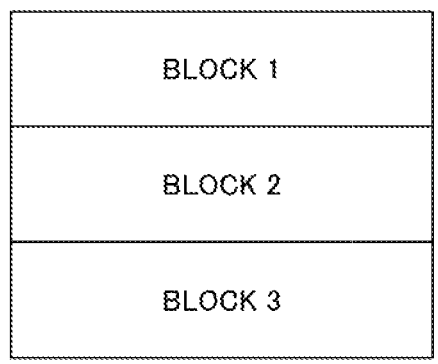
FIG. 6 is a diagram schematically showing an example in which an image area to be subjected to image processing is divided in the image processing device including the memory access device according to the second embodiment of the present invention.

Therefore, in the image processing device 21 including a plurality of image processors 251, in order to reduce the time required for a series of image processing, as shown in FIG. 6, the plurality of image processors 251 perform image processing in parallel by dividing the image area for one frame is divided into a predetermined number of blocks and sequentially performing image processing on the image data included in the blocks divided by the image processors 251. FIG. 6 is a diagram schematically showing an example in which an image area (for one frame) is divided in which image processing is performed in the image processing device 21 including the memory access device according to the second embodiment of the present invention. FIG. 6 shows a case where an image area for one frame is divided into three blocks. In this case, in the image processing device 21, each image processor 251 can perform image processing on the image data included in the divided blocks in parallel.

More specifically, first, the image processor 251-1 performs image processing (hereinafter referred to as "image processing-1") on the preprocessed image data of the block 1 stored in the DRAM 30, and then stores (writes) it again in the DRAM 30. Subsequently, the image processor 251-1 starts image processing-1 for the preprocessed image data of the block 2 stored in the DRAM 30. At this time, the image processor 251-2 can start image processing (hereinafter referred to as "image processing-2") on the image data of block 1 which has been subjected to image processing-1 by the image processor 251-1 and stored (written) in the DRAM 30.

Thereafter, the image processor 251-1 stores (writes) the image data acquired by performing the image processing-1 on the preprocessed image data of the block 2 in the DRAM 30 again, and subsequently starts the image processing-1 for the preprocessed image data of the block 3 stored in the DRAM 30. At this time, when storing (writing) in the DRAM 30 the image data acquired by performing the image processing-2 on the image data of the block 1 which has been subjected to image processing-1 by the image processor 251-1 has been completed, the image processor 251-2 can subsequently start the image processing-2 on the image data of the block 2 which has been subjected to image processing-1 by the image processor 251-1. The image processor 251-3 can start image processing (hereinafter referred to as "image processing-3") on the image data of the block 1 which has been subjected to image processing-2 and stored (written) in the DRAM 30 by the image processor 251-2.

Thereafter, the image processor 251-1 stores (writes) the image data acquired by performing the image processing-1 on the preprocessed image data of the block 3 in the DRAM 30, and completes the processing. At this time, in the case where the image data acquired by performing the image processing-2 on the image data of the block 2 which has been subjected to image processing-1 by the image processor 251-1 has been stored (written) in the DRAM 30, the image processor 251-2 can subsequently start the image processing-2 on the image data of the block 3 which has been subjected to image processing-1 by the image processor 251-1. Also, in the case where storing (writing) of the image data acquired by performing the image processing-3 on the image data of the block 1 which has been subjected to image processing-2 by the image processor 251-2 in the DRAM 30 is completed, the image processor 251-3 can subsequently start the image processing-3 on the image data of the block 2 which has been subjected to image processing-2 by the image processor 251-2.

After that, the image processor 251-2 stores (writes) the image data acquired by performing image processing-2 on the image data of block 3 subjected to image processing-1 by the image processor 251-1 in the DRAM 30, to complete the process. At this time, in the case where storing (writing) of the image data acquired by performing the image processing-3 on the image data of the block 2 subjected to image processing-2 by the image processor 251-2 in the DRAM 30 is completed, the image processor 251-3 can subsequently start the image processing-3 on the image data of the block 3 subjected to image processing-2 by the image processor 251-2.

Finally, the image processor 251-3 stores (writes) the image data acquired by performing the image processing-3 on the image data of the block 3 subjected to image processing-2 by the image processor 251-2 in the DRAM 30, to complete the process.

As described above, when an image area for one frame is divided into a predetermined number of blocks, each image processor 251 can perform image processing on image data included in different blocks in parallel. Thereby, in the image processing device 21 provided with the several image processing part 251, the time which a series of image processing requires can be shortened.

FIG. 6 shows an example in which the image area for one frame is divided into three blocks in the vertical direction, but the method for dividing the image area for one frame is not limited to the dividing method shown in FIG. 6. For example, the image area for one frame may be divided into a plurality of blocks in the horizontal direction, or the image area for one frame may be divided into a plurality of blocks in the vertical direction and the horizontal direction. Further, for example, each block area acquired by dividing the image area for one frame may be further divided into a plurality of small blocks. In this case, each of the image processors 251 may output a signal indicating the number of small blocks that have completed image processing up to the current time among a plurality of small blocks divided in the block currently being processed, as an image processing progress status signal PS for notifying the progress status of image processing in each block.

Similar to the memory access device according to the first embodiment, in the memory access device according to the second embodiment including a plurality of image processors 251, the limit time is is defined so that the operation or function of the imaging device 2 or the image processing device 21 as a system does not break down. Therefore, in the memory access device according to the second embodiment, the time until a series of image processing by the image processor 251 completes is set as the limit time in order to prevent a series of image processing performed by each image processor 251 from being stopped due to a waiting state. That is, also in the memory access device according to the second embodiment, the limit time is set based on the idea that the priority switching control part 2514 controls so that the priority at which the access request output by each image processor 251 is accepted (permitted) by the bus arbiter 220 is increased before a series of image processing executed by each image processor 251 is stopped due to a waiting state occurring. In the memory access device according to the second embodiment including the plurality of image processors 251, the limit time is set based on various concepts according to the configuration of the image processor 251 and the series of image processing performed by the image processor 251.

Here, an example of the concept of the limit time set according to a series of image processing performed by the plurality of image processors 251 will be described. In the following description, an example of the concept of the limit time set in units of a series of image processing performed sequentially by each of the three image processors 251-1 to 251-3 will be described in the case where an image area for one frame is divided into three blocks as shown in FIG. 6.

For example, consider a case where the operation mode of the imaging device 2 is a shooting mode for shooting a still image of a subject. In this case, it is necessary that each image processor 251 stores (writes) the image-processed image data (still image data) subjected to the series of image processing in the DRAM 30 until the timing at which the display processor 260 acquires (reads) the image-processed image data stored in the DRAM 30 in order to display the display image corresponding to the image-processed image data on the display device 40. For this reason, the limit time is set based on the time when the third-stage image processor 251-3, which is the final-stage image processor 251 that generates image-processed image data (still image data), finishes storing (writing) the final image-processed image data (still image data) in the DRAM 30 and the timing at which the display processor 260 acquires (reads) the image-processed image data of each frame from the DRAM 30.

Figure 7:
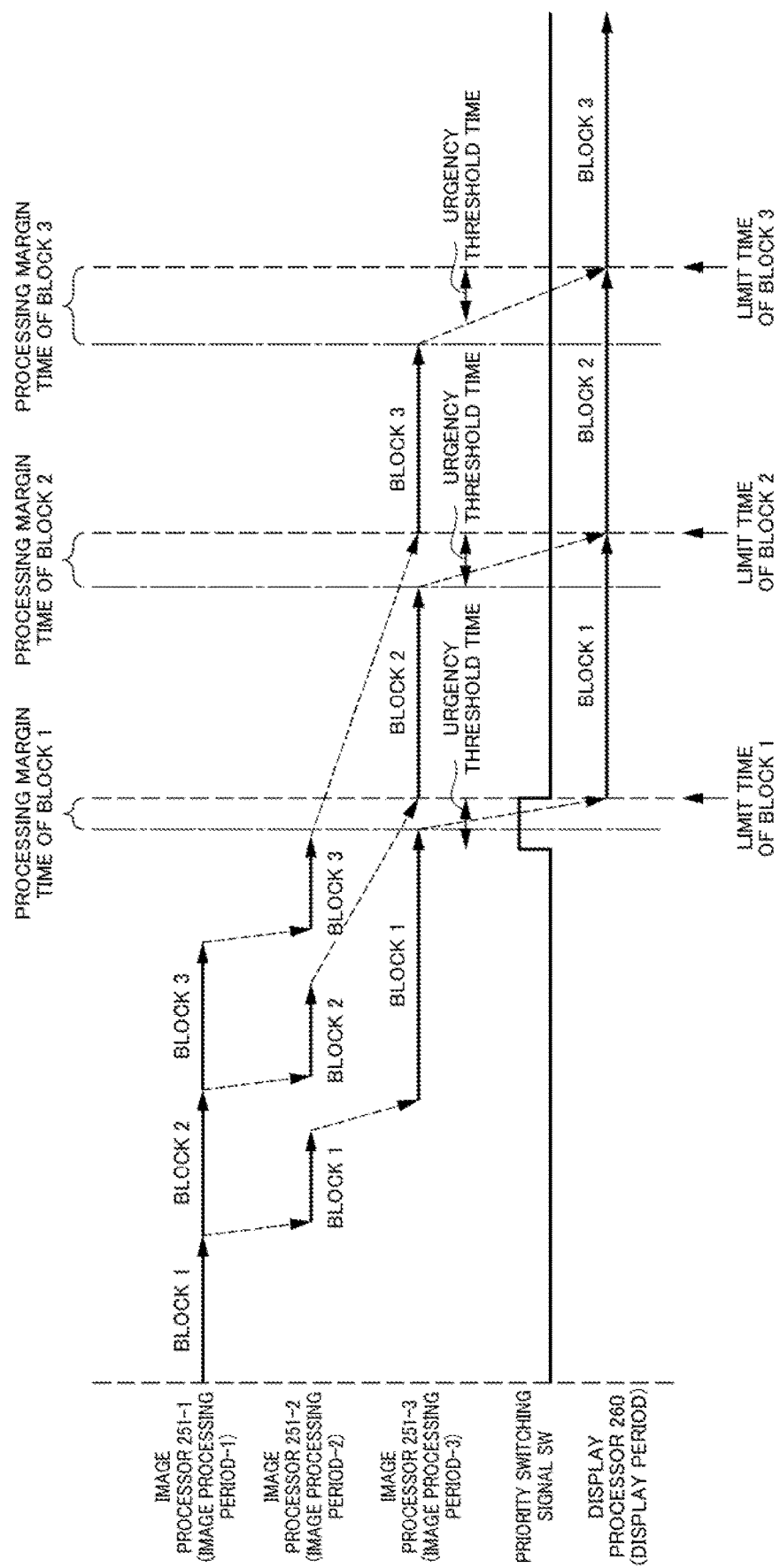
FIG. 7 is a diagram schematically showing an example of a relationship between a limit time and an image processing period in the memory access device according to the second embodiment of the present invention.

In this case, the relationship between the limit time and the period during which each image processor 251 performs image processing is as shown in FIG. 7. FIG. 7 is a diagram schematically showing an example of a relationship between a limit time and an image processing period in the memory access device according to the second embodiment of the present invention. In FIG. 7, an example of the relationship between the limit time set for each block, the image processing period in which each image processor 251 performs image processing on each block, and the period (display period) during which the display processor 260 displays a display image corresponding to one frame of image-processed image data on the display device 40 is shown typically.

More specifically, FIG. 7 shows an image processing period (image processing period-1) in which the image processor 251-1 performs image processing on each block, an image processing period (image processing period-2) in which the image processor 251-2 performs image processing on each block, and an image processing period (image processing period-3) in which the image processor 251-3 performs image processing on each block. The image processing period-1 is an image processing period including the operation period of the read DMA transfer in which the image processor 251-1 acquires (reads) the preprocessed image data included in the block from the DRAM 30, the operation period in which image processing (image processing-1) is performed on the pre-processed image data of the obtained block, and the operation period of the write DMA transfer in which the image data of the block after the image processing-1 is stored (written) in the DRAM 30. The image processing period-2 is an image processing period including the operation period of the read DMA transfer in which the image processor 251-2 acquires (reads) the image data subjected to the image processing-1 included in the block from the DRAM 30, the operation period in which image processing (image processing-2) is performed on the acquired block image data, and the operation period of the write DMA transfer in which image data of a block after image processing-2 is stored (written) in the DRAM 30. The image processing period-3 is an image processing period including the operation period of a read DMA transfer in which the image processor 251-3 acquires (reads) the image data subjected to the image processing-2 included in the block from the DRAM 30, the operation period in which image processing (image processing-3) is performed on the image data of the acquired block, and the operation period of the write DMA transfer in which image data of a block after image processing-3 is stored (written) in DRAM 30.

FIG. 7 shows a period during which the display processor 260 acquires (reads out) the image-processed image data of each block from the DRAM 30 to perform the display processing in order to display the display image corresponding to the image-processed image data for one frame on the display device 40 as a display period. When the display processing for the image-processed image data of the three divided blocks is completed, that is, when the generation of the display image for one frame is completed, the display processor 260 can output the generated display image to the display device 40 for display.

As shown in FIG. 7, the limit time in each block is set to a timing at which the display processor 260 starts acquiring (reading) the image-processed image data of each block from the DRAM 30. In other words, the limit time in each block is set in units of a series of image processing that each of the image processors 251-1 to 251-3 sequentially performs on the same block. For this reason, each image processor 251 performs image processing so that a series of image processing is completed by the limit time set for each block.

At this time, the priority switching control part 2514 calculates the remaining processing time in each image processor 251 based on each image processing progress status signal PS output from each image processor 251. Then, the priority switching control part 2514 calculates the remaining processing time of a series of image processing performed by each image processor 251 by adding up the remaining processing times of the calculated image processors 251. Thereafter, the priority switching control part 2514 calculates the processing margin time in each block based on the remaining processing time of the calculated series of image processing, the block limit time, and the current elapsed time. FIG. 7 also shows the processing margin time in each block calculated by the priority switching control part 2514. Then, the priority switching control part 2514 determines the urgency of a series of image processing performed by each image processor 251 based on the calculated processing margin time of each block.

The priority switching control part 2514 determines the urgency of a series of image processing based on the block processing margin time in the same manner as the priority switching control part 2504 in the first embodiment. That is, the priority switching control part 2514 compares the calculated processing margin time of each block with the urgency threshold time. When the processing margin time is equal to or greater than the urgency threshold time, it is determined that the urgency of a series of image processing by each image processor 251 is low. When the processing margin time is shorter than the urgency threshold time, it is determined that the urgency of a series of image processing by each image processor 251 is high.

Then, the priority switching control part 2514 generates a priority switching signal SW for notifying that the priority set in each image processor 251 is switched based on the determined result, and outputs it the bus arbiter 220. Thus, when arbitrating access requests from the respective processing blocks to the DRAM 30, the bus arbiter 220 preferentially accepts (permits) an access request from the image processor 251 whose priority is switched high according to the priority switching signal SW. More specifically, the bus arbiter 220 preferentially accepts (permits) the read DMA transfer access request and the write DMA transfer access request output from each of the image processors 251-1 to 251-3.

FIG. 7 shows an example of a case where the image processing in each image processor 251 has been completed by the limit time set for each block. FIG. 7 shows an example of the urgency threshold time and an example of the priority switching signal SW that the priority switching control part 2514 outputs to the bus arbiter 220. In the example of the priority switching signal SW shown in FIG. 7, it is notified that the priority set to each image processor 251 is switched to a higher level in the image processing period-3 of the block 1 in the image processor 251-3. In FIG. 7 as well, the level represented by the priority switching signal SW is the same as that of the example of the priority switching signal SW in the memory access device according to the first embodiment shown in FIGS. 3 and 4.

Here, as in the example shown in FIG. 7, when the priority switching signal SW for notifying that the priority set in each image processor 251 is to be switched to a high is output during the image processing period-3 of the block 1 in the image processor 251-3, the bus arbiter 220 can be preferentially accepts (permits) the access request for read DMA transfer or the access request for write DMA transfer output from each of the image processors 251-2 and 251-3. For this reason, when the access request from the image processor 251-2 is output earlier than the access request from the image processor 251-3, it is conceivable that the bus arbiter 220 preferentially accepts (permits) the access request output from the image processor 251-2. However, the image processor 251-3 performs a series of image processing for the block 1, and the image processor 251-2 performs a series of image processing for the block 3. Therefore, the priority switching control part 2514 determines the urgency of image processing of the image processor 251-3 that performs a series of image processing on the block 1 and needs to complete the series of image processing first is higher, and outputs the priority switching signal SW for notifying that the priority set in the image processor 251-3 is to be switched to be higher to the bus arbiter 220.

The method of notifying which of the image processors 251 the priority switching control part 2514 switches to a higher priority among the plurality of image processors 251 is the method of generating a plurality of priority switching signals SW corresponding to each of the plurality of image processors 251 so that only the priority switching signal SW corresponding to any one of the image processors 251 is put into a state indicating that the priority is switched high. However, as a method in which the priority switching control part 2514 notifies which of the image processors 251 among the plurality of image processors 251 is to switch the priority set higher may be, for example, a method of outputting information indicating which of the image processors 251 is to be switched to a higher priority together with a priority switching signal SW common to all the image processors 251 may be used.

As a result, the bus arbiter 220 preferentially accepts (permits) the read DMA transfer access request or the write DMA transfer access request output from the image processor 251-3.

Thus, in the example shown in FIG. 7, the image processing period-3 of the block 1 in the image processor 251-3 is shorter than the image processing period-3 currently shown in FIG. 7. In other words, the processing margin time of block 1 shown in FIG. 7 is longer than the processing margin time of block 1 currently shown in FIG. 7.

Accordingly, in the example shown in FIG. 7, it is possible to reduce the factors that a series of image processing for the block 1 by each image processor 251 exceeds the limit time of the block 1 and causes a failure in the series of image processing in the shooting mode in the imaging device 2. That is, each image processor 251 can reliably complete the series of image processing for the block 1 by the limit time of the block 1, and the imaging device 2 can perform the series of image processing in the shooting mode without delay.

As described above, the priority switching control part 2514 calculates the remaining processing time for each image processor 251. Therefore, the priority switching control part 2514 can determine the urgency of image processing for each image processor 251. Also in this case, the priority switching control part 2514 outputs the priority switching signal SW corresponding to each of the image processors 251 to the bus arbiter 220 based on the determined result. As a result, when arbitrating an access request to the DRAM 30 from each processing block, the bus arbiter 220 can preferentially accept (permit) an access request from any of the image processors 251 based on the priority switching signal SW corresponding to each image processor 251.

Next, another example of the concept of limit time set according to a series of image processing performed by the plurality of image processors 251 will be described. When setting a limit time for each image processor 251, each limit time is acquired and set according to the following procedure.

(Procedure 1)

First, a reference time for a series of image processing is set.

More specifically, an absolute limit time that the image processor 251 at the final stage in the series of image processing needs to complete the image processing is set as a reference time. This is because it is necessary to secure a time for the image processor 251 at the final stage to complete storing (writing) of the final image-processed image data (still image data) in the DRAM 30 so that the operation and function of the imaging device 2 and the image processing device 21 as a system are not broken.
(Procedure 2)

Subsequently, the time required for the image processing sequentially performed by each image processor 251 is traced back from the reference time, and the limit time in each image processor 251 performing a series of image processing is temporarily set.

Here, the time required for image processing in each image processor 251 is the processing time required for image processing for each block by each image processor 251. For this reason, the time required for image processing can be calculated, for example, in the same manner as the method of calculating the total processing time in the above equation (1). At this time, when calculating the time required for image processing, the total number of output pixels in the above equation (1) is the number of pixels of one block of image-processed image data (still image data or video image data) output by the image processor 251 performing image processing. The time required for image processing in each image processor 251 may be acquired by any method as long as it is processing time required for image processing for one block. For example, it may be a processing time when each image processor 251 performs image processing for one block at the fastest speed.

More specifically, an absolute limit time in a series of image processing set as a reference time is set as a temporary limit time for image processing performed by the image processor 251 at the final stage. After that, as the temporary limit time of the image processing performed by the image processor 251 immediately preceding the final-stage image processor 251, the time acquired by subtracting the time required for image processing performed by the image processor 251 at the final stage is set from the set temporary limit time of the image processor 251 at the final stage. After that, as the temporary limit time of the image processing performed by the image processor 251 one step before (that is, two steps before) the image processor 251 of the previous step, the time acquired by subtracting the time required for the image processing performed by the immediately preceding image processor 251 is set from the set temporary limit time of the immediately preceding image processor 251. By repeating such a calculation, a temporary limit time for image processing performed by the respective image processors 251 are sequentially set until the first stage image processor 251 in the series of image processing sequentially performed by each image processor 251.
(Procedure 3)

Next, the time that the processor 251 must start image processing in order for the final stage image processor 251 to complete storing (writing) of the final image-processed image data (still image data) in the DRAM 30 in the series of image processing is acquired.

More specifically, the time acquired by subtracting the time required for image processing performed by the first-stage image processor 251 from the temporary limit time set for the first-stage image processor 251 is defined as the time during which the first-stage image processor 251 must start image processing (hereinafter, referred to as "image processing start time").

(Procedure 4)

Subsequently, the difference time between the time during which the first-stage image processor 251 can start image processing in a series of image processing (hereinafter, referred to as "image processing startable time") and the image processing start time is acquired. This difference time corresponds to the total processing margin time in a series of image processing performed by each image processor 251.
(Procedure 5)

Finally, the difference time acquired in Procedure 4 is allocated to each image processor 251 that performs a series of image processing, and the time acquired by subtracting the allocated difference time from the temporary limit time set in each image processor 251 is set as the limit time in each image processor 251. The amount (time) of allocating the difference time acquired in Procedure 4 to each image processor 251 may be equal to the time of each image processor 251. In addition, the amount (time) of allocating the difference time acquired in Procedure 4 to each image processor 251 may be a time corresponding to a ratio (percentage) determined based on the time required for the image processing performed by each image processor 251. That is, more difference times may be assigned to the image processor 251 that requires more time for image processing.

The limit time acquired by such a procedure is set for each image processor 251 that performs a series of image processing. The above-described procedure 1 to procedure 5 are procedures for setting a limit time for each image processor 251 when performing image processing of one block. Therefore, when an image area for one frame is divided into a predetermined number of blocks, the above-described procedure 1 to procedure 5 are repeated in order from the block to perform image processing at first to the block to perform image processing at the end.

Here, as a more specific example of Procedures 1 to 5 for setting the limit time for each image processor 251, the case where the limit time is set for each of the image processor 251-1 to image processor 251-3 will be described. In the following description, the operation mode of the imaging device 2 is a shooting mode for shooting a still image of a subject, and an example of a concept of setting a limit time for each image processor 251 in a case where an image area for one frame is divided into three blocks as shown in FIG. 6 will be described.

Figure 8:
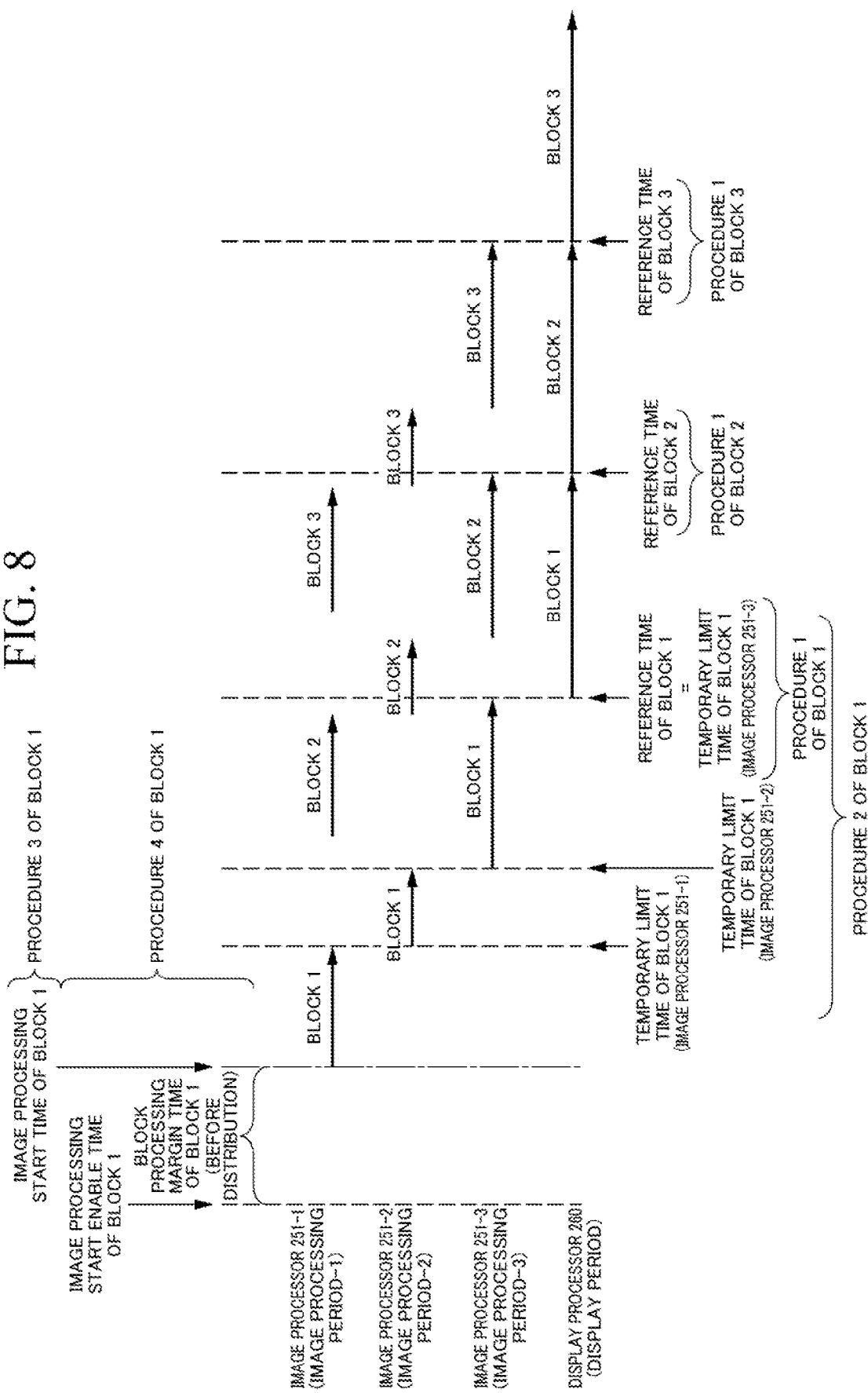
FIG. 8 is a diagram schematically showing an example of a procedure for setting a limit time in the memory access device according to the second embodiment of the present invention.
Figure 9:
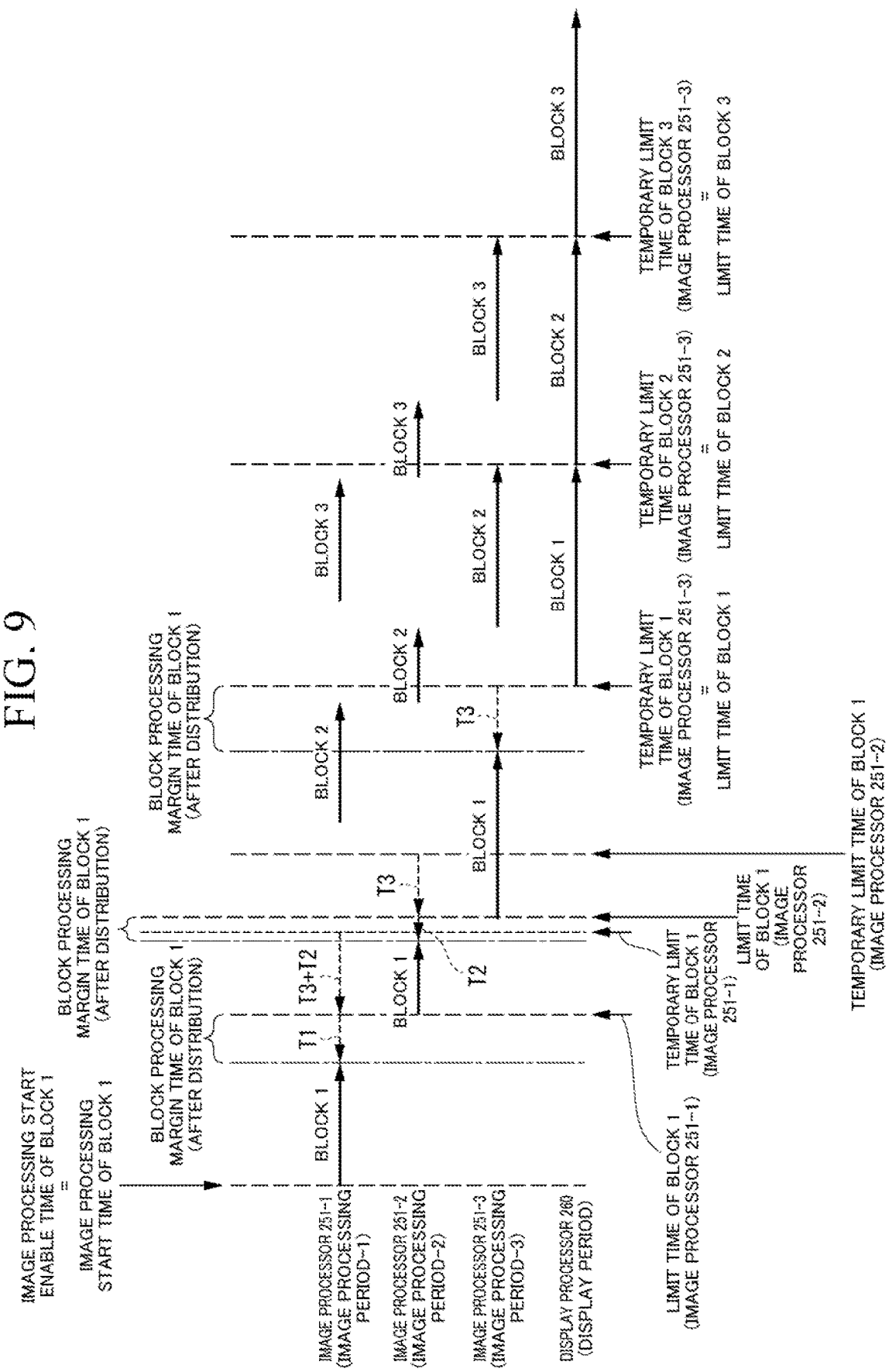
FIG. 9 is a diagram schematically showing an example of a procedure for setting a limit time in the memory access device according to the second embodiment of the present invention.

FIGS. 8 and 9 are diagrams schematically showing an example of a procedure for setting a limit time in the memory access device according to the second embodiment of the present invention. FIG. 8 schematically shows an example of a time relationship when the above-described procedure 1 to procedure 4 are performed in the case where the limit time is set for each image processor 251. FIG. 9 schematically shows an example of a time relationship when the above-described procedure 5 is performed in the case where the limit time is set for each image processor 251. FIGS. 8 and 9 show image processing periods in which each image processor 251 performs image processing on each block, and show only the time relationship when the limit time corresponding to block 1 is set in each image processor 251. That is, FIG. 8 and FIG. 9 show the image processing period-1 of the image processor 251-1, the image processing period-2 of the image processor 251-2, and the image processing period-3 of the image processor 251-3. However, FIG. 8 and FIG. 9 show the procedure for setting the limit time in each image processor 251 only in the case where the limit time corresponding to block 1 is set. As an example of an absolute limit tune set as a quasi-time, FIGS. 8 and 9 show the period (display period) in which the display processor 260 displays a display image corresponding to one frame of image-processed image data on the display device 40.

First, an example of a preparation stage before setting a limit time corresponding to block 1 will be described with reference to FIG. 8.

In the preparation stage for setting the limit time, first, in Procedure 1, a reference time for a series of image processing is set. In the example shown in FIG. 8, the display processor 260 acquires the image-processed image data of block 1 from the DRAM 30 in order to display the display image corresponding to the image-processed image data for one frame on the display device 40. The timing at which the display process is started (read out) is an absolute limit time at which the final-stage image processor 251-3 needs to complete the image processing for the block 1. Therefore, in Procedure 1, the timing at which the display processor 260 starts acquiring (reading) the image-processed image data of the block 1 from the DRAM 30 is set as a reference time.

Subsequently, in Procedure 2, a temporary limit time for image processing performed by each image processor 251 is set. In the example shown in FIG. 8, first, as the temporary limit time in the image processing of block 1 performed by the image processor 251-3 at the final stage, the absolute limit time set as the reference time in procedure 1 is set. Thereafter, as a temporary limit time in the image processing of block 1 performed by the image processor 251-2 at the preceding stage of the image processor 251-3, the time acquired by subtracting the image processing period-3 in the image processor 251-3 from the temporary limit time of the image processor 251-3 is set. Thereafter, as a temporary limit time in the preceding stage of the image processor 251-2, that is, in the block 1 image processing performed by the first stage image processor 251-1, the time acquired by subtracting the image processing period-2 in the image processor 251-2 from the temporary limit time of the image processor 251-2 is set.

Subsequently, in Procedure 3, the first stage image processor 251-1 acquires the image processing start time for starting the image processing of block 1. In the example shown in FIG. 8, the time acquired by subtracting the image processing period-1 in the image processor 251-1 from the temporary limit time in the image processing of block 1 performed by the image processor 251-1 is acquired as the image processing start time of block 1 in the image processor 251-1.

Subsequently, in Procedure 4, an image processing startable time during which the first stage image processor 251-1 can start the image processing of block 1 is set. Then, a difference time between the set image processing startable time and the image processing start time acquired in Procedure 3 is acquired. In the example shown in FIG. 8, the time when the captured image reception part 240 completes storing (writing) the preprocessed image data in the DRAM 30 is the earliest time that the image processor 251-1 can start the image processing of the block 1. For this reason, in Procedure 4, the time when the captured image reception part 240 completes storing (writing) the preprocessed image data in the DRAM 30 is set as the image processing startable time. Then, a difference time from the image processing start time acquired in Procedure 3 is acquired. As described above, the difference time corresponds to the total processing margin time when each image processor 251 performs a series of image processing on the block 1. In the example shown in FIG. 8, the difference time acquired in Procedure 4 is distinguished from the processing margin time calculated by the priority switching control part 2514 in order to determine the urgency of the image processing performed by the image processor 251, and is shown as "block processing margin time" of block 1 before allocation.

Next, an example of a stage for setting a limit time corresponding to the block 1 will be described with reference to FIG. 9.

In the limit time setting stage, first, the temporary limit time set in the image processor 251-3 at the final stage is determined and set as the limit time for image processing of block 1 performed by the image processor 251-3. In the example shown in FIG. 9, the temporary limit time set in the image processor 251-3 in Procedure 2, that is, the absolute limit time set as the reference time in Procedure 1 is determined and set as the limit time in the image processing of the block 1 performed by the image processor 251-3. In the example shown in FIG. 9, the time T3 is allocated to the image processor 251-3 among the difference time (block processing margin time) acquired in Procedure 4. Here, the block processing margin time T3 allocated to the image processor 251-3 is a time temporarily set in order to provide a margin for the processing time required for the image processing of the block 1 by the image processor 251-3.

Thereafter, the time acquired by subtracting the block processing margin time allocated to the image processor 251-3 from the temporary limit time set in the image processor 251-2 in the preceding stage of the image processor 251-3 is determined and set as the limit time of the image processing of the block 1 performed by the image processor 251-2. In the example shown in FIG. 9, the time acquired by subtracting the block processing margin time T3 allocated to the image processor 251-3 from the temporary limit time set in the image processor 251-2 in Procedure 2 is determined and set as the limit time of the image processing of the block 1 performed by the image processor 251-2. In the example shown in FIG. 9, time T2 is allocated to the image processor 251-2 among the block processing margin time acquired by Procedure 4. Here, the block processing margin time T2 allocated to the image processor 251-2 is a time temporarily set in order to provide a margin for the processing time required for the image processing of the block 1 by the image processor 251-2. The limit time of the image processor 251-2 set here is equivalent to the time acquired by subtracting the block processing margin time T3 allocated to the image processor 251-3 from the limit time of the image processor 251-3, and further subtracting the image processing period-3 in the image processor 251-3.

Thereafter, a time acquired by subtracting the block processing margin time allocated to the image processor 251-3 and the image processor 251-2 from the temporary limit time set in the image processor 251-1 at the preceding stage of the image processor 251-2 is determined and set as the limit time for image processing of block 1 performed by the image processor 251-1. In the example shown in FIG. 9, a time acquired by subtracting a time T3+T2, which is acquired by combining the block processing margin time T3 allocated to the image processor 251-3 and the block processing margin time T2 allocated to the image processor 251-2, from the temporary limit time set in the image processor 251-1 in Procedure 2 is determined and set as the limit time of the image processing of the block 1 performed by the image processor 251-1. In the example shown in FIG. 9, the time T1 acquired by subtracting the block processing margin time T3 allocated to the image processor 251-3 and the block processing margin time T2 allocated to the image processor 251-2 from the block processing margin time acquired in Procedure 4 is allocated to the processor 251-1. In other words, the remaining block processing margin time allocated to each of the image processor 251-3 and the image processor 251-2 among the block processing allowance time acquired by Procedure 4 is allocated to the image processor 251-1. Here, the block processing margin time T1 allocated to the image processor 251-1 is a time temporarily set to give a margin to the processing time required for the image processing of the block 1 by the image processor 251-1. Here, the set limit time of the image processor 251-1 is equivalent to a time acquired by subtracting the block processing allowance time T2 allocated to the image processor 251-2 from the limit time of the image processor 251-2, and further subtracting the image processing period-2 in the image processor 251-2.

In this manner, the limit time corresponding to block 1 is set for each image processor 251. After that, as described above, Procedures 1 to 5 are performed on the block 2 to set the limit time corresponding to the block 2. The image processing startable time of the first-stage image processor 251-1 set in Procedure 4 performed for the block 2 is the limit time of the image processor 251-1 set in Procedure 5 for the block 1. This is because the time when the image processor 251-1 completes the image processing on the block 1 is the earliest time when the image processor 251-1 can start the image processing of the block 2.

Thereafter, similarly, Procedures 1 to 5 are performed on the block 3, and the limit time corresponding to the block 3 is set.

As described above, the difference time (block processing margin time) assigned to each of the image processors 251 in Procedure 5 for each block is a time temporarily set in order to allow a margin in the processing time required for image processing of each block by each image processor 251. For this reason, the remaining processing time calculated by the priority switching control part 2514 based on the image processing progress status signal PS output when each image processor 251 actually performs image processing on each block may be different from the processing margin time calculated based on the limit time set by repeating Procedures 1 to 5 and the current elapsed time.

More specifically, the actual image processing for the block in each image processor 251 may be completed without consuming the time (block processing margin time) temporarily set to allow a sufficient processing time. That is, the block processing margin time temporarily set in the image processor 251 may remain as a result of actual image processing. In this case, the block processing margin time that has not been consumed (remains) may be allocated to the subsequent image processor 251 again, and the processing time required for image processing of the same block by the subsequent image processor 251 may have more margin. The amount (time) of allocating the block processing margin time that has not been consumed (remains) to the subsequent image processor 251 may be equal to a time equivalent to the subsequent image processor 251. In addition, the amount (time) of allocating the block processing margin time that has not been consumed (remains) to the subsequent image processor 251 may be a time corresponding to a ratio (percentage) determined based on the time required for image processing performed by the subsequent image processor 251. That is, the block processing margin time that has not been consumed (remains) may be allocated to the image processor 251 that requires more time for image processing. By reallocating the block processing margin time that has not been consumed (remains) to the subsequent image processor 251, the currently set limit time may be set again in the subsequent image processor 251.

On the other hand, the actual image processing for the block in each image processor 251 may not be completed even if the time (block processing margin time) that is temporarily set in order to give a margin to the processing time is consumed. In other words, the block processing margin time temporarily set in the image processor 251 may not be sufficient as a time for giving a margin to the processing time required for actual image processing. In this case, insufficient block processing margin time is used as the time for providing a margin for the processing time required for the image processing, so that image processing is performed by consuming the block processing margin time allocated to the subsequent image processor 251. At this time, the block processing margin time that is not sufficient may consume the block processing margin time allocated to the immediately subsequent image processor 251. Further, the insufficient block processing margin time may evenly consume the block processing margin time allocated to the subsequent image processor 251. Further, the insufficient block processing margin time may be consumed according to a ratio (percentage) determined based on the time required for the image processing performed by the subsequent image processor 251. Further, the insufficient block processing margin time may consume the block processing margin time of the subsequent image processor 251 to which the most block processing margin time is allocated. In the subsequent image processor 251 in which the allocated block processing margin time has decreased due to the consumption of the insufficient block processing margin time, the set limit time is not set again, and the image processing is completed by the currently set limit time.

As a result, the priority switching control part 2514 determines the urgency of the image processing performed by the subsequent image processor 251 so that the subsequent image processor 251 recovers the block processing margin time that is excessively consumed by the previous image processor 251, and generates the priority switching signal SW based on the determined result to output to the bus arbiter 220.

Thereby, similarly to the memory access device according to the first embodiment, in the memory access device according to the second embodiment, the completion of image processing for each block by each image processor 251 is not delayed so that the set block limit time is not exceeded. As a result, similarly to the memory access device according to the first embodiment, in the memory access device according to the second embodiment, it is possible to reduce a factor that causes a series of image processing failures in the system (the imaging device 2 or the image processing device 21) including the memory access device according to the second embodiment. That is, similarly to the memory access device according to the first embodiment, in the memory access device according to the second embodiment, the image processing of each block in each image processor 251 can be surely completed by the set block limit time, and a series of image processing in a system (the imaging device 2 or the image processing device 21) equipped with the memory access device according to the second embodiment can be performed without delay.

Note that, in the second embodiment as well, some ideas for setting a limit time according to image processing for blocks performed by the image processor 251 have been described. However, in the memory access device according to the second embodiment, the concept of the limit time set according to the image processing performed by the image processing module 2502 is not limited to the concept described above. That is, the concept of the set block limit time in the memory access device according to the second embodiment may be any concept as long as it is based on the idea that the priority switching control part 2514 controls so that the priority at which the access request output by each image processor 251 is accepted (permitted) by the bus arbiter 220 is increased before a series of image processing performed by each image processor 251 is stopped due to a waiting state occurring, as described above.

According to the second embodiment, a memory access device is configured as follows. A plurality of data processors (image processors 251-1 to 251-3) that are configured to sequentially perform corresponding data processing (image processing) in a series of processing in a predetermined order are provided. Each data processor performs the corresponding data processing (image processing-1 to image processing-3) included in a series of different processing (image processing of different blocks) in parallel by the plurality of data processors by starting corresponding data processing (image processing-1 to image processing-3) included in the next series of processing (for example, image processing for block 2) after the corresponding data processing (image processing-1 to image processing-3) included in the previously started series of processing (image processing for block 1) is completed. The priority switching control part 2514 determines the urgency of data processing (image processing) by each data processor in unit of a series of processing (unit of a series of image processing), based on the progress status of the data processing (image processing-1 to image processing-3) notified from each data processor (the output image processing progress signal PS). When it is determined that the urgency of data processing (image processing) in the plurality of data processors is high, a priority switching signal SW is output notifying that the priority of the data processor (any one of the image processors 251-1 to 251-3) that performs the corresponding data processing (image processing) included in a series of processing started earlier (for example, image processing for block 1).

Further, according to the second embodiment, a memory access device is configured as follows. A plurality of data processors (image processors 251-1 to 251-3) that sequentially perform corresponding data processing (image processing) in a series of processing in a predetermined order are provided. Each data processor performs the corresponding data processing (image processing-1 to image processing-3) included in a series of different processing (image processing of different blocks) in parallel by the plurality of data processors by starting corresponding data processing (image processing-1 to image processing-3) included in the next series of processing (for example, image processing for block 2) after the corresponding data processing (image processing-1 to image processing-3) included in the series of processing (image processing for block 1) started earlier. The priority switching control part 2514 calculates the processing margin time for each data processor based on the remaining processing time for each data processor calculated based on the progress status of data processing (image processing-1 to image processing-3) notified from each data processor (output image processing progress signal PS), the limit time set for each data processor in each series of processing (block image processing), and the processing time for each data processor (current elapsed time). The urgency of data processing (image processing-1 to image processing-3) is determined for each data processor based on the processing margin time and the urgency threshold time for each data processor. A priority switching signal SW for notifying that the priority is to be increased so that the completion of the data processing (image processing-3) by the data processor (image processor 251-3) that performs the final data processing (image processing-3) in each series of processing (block image processing) does not exceed the set limit time.

As described above, in the memory access device according to the second embodiment, each image processor 250 (the image processing module 2502 provided in the image processor 251) notifies the priority switching control part 2514 of the progress status of the image processing being performed by the image processing progress signal PS. In the memory access device according to the second embodiment, the priority switching control part 2514 calculates the remaining processing time for each image processor 251, using the image processing progress status signal PS output from the image processor 251, and calculates a processing margin time using the set limit time, the current elapsed time, and the calculated remaining processing time. In the memory access device according to the second embodiment, the priority switching control part 2514 compares the calculated processing margin time and the urgency threshold time to determine the urgency of image processing performed by the provided image processing module 2502 provided in the image processor 251 for each image processor 251, and outputs a priority switching signal SW for notifying the urgency of image processing performed by the image processor 251 to the bus arbiter 220 at an early timing.

Accordingly, in the memory access device according to the second embodiment, the priority switching control part 2514 can request the bus arbiter 220 to switch (change) the priority of the image processor 251. In the memory access device according to the second embodiment, when arbitrating an access request to the DRAM 30 from each processing block, the bus arbiter 220 determines a processing block that accepts (permits) an access request to the DRAM 30 in a state in which the priority of any one of the image processors 251 is switched according to the priority switching signal SW output from the priority switching control part 2514. In other words, in the memory access device according to the second embodiment, an access request from any of the image processors 251 to the DRAM 30 is accepted (permitted) before the completion of a series of image processing for each block by each image processor 251 is delayed and the set limit time is exceeded.

As a result, in the system (imaging device 2 or image processing device 21) in which the memory access device according to the second embodiment is mounted, the factors that cause a series of image processing for the divided blocks are reduced, and the image processing for each block in each image processor 251 can be more reliably completed until the set limit time. As a result, in the system (the imaging device 2 and the image processing device 21) in which the memory access device according to the second embodiment is mounted, a series of image processing to be realized is performed smoothly without delay without causing any failure in the operation and function of the system.

As described above, according to each embodiment of the present invention, the image processing module in the image processor provided in the image processing device constituting the memory access device of the present invention outputs an image processing progress status signal for notifying the processing progress status of the image processing on the image data. In each embodiment of the present invention, the priority switching control part configuring the memory access device of the present invention calculates the remaining processing time when the image processing module in the image processor provided in the image processing device configuring the memory access device of the present invention performs image processing, based on the image processing progress status signal PS. In each embodiment of the present invention, the priority switching control part configuring the memory access device of the present invention determines the urgency of the image processing performed by the image processing module based on the calculated remaining processing time, the limit time of the image processing defined as the time required for the image processing module to complete the image processing, and the current elapsed time. In each embodiment of the present invention, the priority switching control part configuring the memory access device of the present invention generates a priority switching signal for notifying the urgency of the image processing performed by the image processing module based on the determined result, and outputs it to the bus arbiter constituting the memory access device of the present invention. In each embodiment of the present invention, when the bus arbiter constituting the memory access device of the present invention arbitrates access requests to the DRAM from the respective processing blocks connected to the common data bus, the priority of the image processor provided in the image processing device constituting the memory access device of the present invention is increased in accordance with the priority switching signal output from the priority switching control part, and the access request from the image processor is preferentially accepted (permitted). As a result, in each embodiment of the present invention, the completion of the image processing performed by the image processor provided in the image processing device constituting the memory access device of the present invention is not delayed, and the specified limit time is not exceeded. In other words, in each embodiment of the present invention, the image processing performed by the image processor provided in the image processing device that constitutes the memory access device of the present invention can be completed by a specified limit time without stopping due to a waiting state in the image processing.

Thus, in each embodiment of the present invention, it is possible to reduce factors that cause a failure in a series of image processing in a system equipped with the memory access device of the present invention. That is, in each embodiment of the present invention, in the system equipped with the memory access device of the present invention, the operation of the image processor (image processing module), which may cause a failure in the operation and function of the system, is not stopped, and a series of image processing on the image data can be performed smoothly without any delay.

In the embodiments of the present invention, the configuration in which the memory access device of the present invention is provided in the image processing device mounted on the imaging device has been described. However, various systems other than the image processing device and the imaging device shown in each embodiment of the present invention can be considered as a system including a memory access device that transfers data to and from the DRAM. For example, various systems are conceivable, such as a system that performs predetermined processing (audio processing) on audio data. Therefore, the processing device and system to which the memory access device based on the concept of the present invention can be applied are not limited at all. That is, the concept of the memory access device of the present invention can be similarly applied to any processing device or system as long as it is a processing device or system that performs predetermined processing on data transferred to and from the DRAM. The same effect as that of the memory access device of the present invention can be acquired.

As described above, although preferable embodiment of the present invention has been described, the present invention is not limited to these embodiment and its modification. Additions, omissions, substitutions, and other modifications can be made without departing from the spirit of the present invention.

Further, the present invention is not limited by the above description, and is limited only by the scope of the appended claims.

What is claimed is:

1. A memory access device comprising:
    a data processor configured to output an access request requesting access to a memory connected to a data bus, perform a data processing on data in the accessed memory, and provide notification of a progress status of the data processing;
    a priority switching control part configured to determine an urgency of the data processing by the data processor according to the progress status of the data processing notified from the data processor, and output a priority switching signal notifying switching of a priority of the data processor; and
    a bus arbiter connected to the data bus, configured to change the priority of the data processor according to the priority switching signal to arbitrate the access request output from the data processor, and control access to the memory according to the access request that has been arbitrated;
    wherein the priority switching control part is configured
        to calculate a remaining processing time in the data processing performed by the data processor, according to the progress status of the data processing notified from the data processor,
        to calculate a processing margin time when the data processor performs the data processing, according to the remaining processing time, a limit time defined as a time that the data processor needs to complete the data processing, and a processing time from a start of the data processing by the data processor to the present, and
        to determine the urgency of the data processing by the data processor, according to the processing margin time and a predetermined urgency threshold time,
        when the processing margin time is shorter than the predetermined urgency threshold time, to determine that the urgency of the data processing by the data processor is high, and to output the priority switching signal notifying that the priority of the data processor is to be increased, and
        when the processing margin time is not shorter than the urgency threshold time, to determine that the urgency of the data processing by the data processor is low, and to output the priority switching signal notifying that the priority of the data processor remains low; and
    the bus arbiter is configured to arbitrate the access request output from the data processor by increasing the priority of the data processor notified to increase the priority by the priority switching signal.

2. The memory access device according to claim 1, wherein the data processor is configured to notify a processing completion rate indicating a rate of completion of the data processing as the progress status of the data processing, and the priority switching control part is configured to calculate the remaining processing time according to a data processing speed and processing amount in the data processor and the notified processing completion rate.

3. The memory access device according to claim 1, wherein the data processor is configured to notify a processing completion number indicating the number of times that the data processing is completed as the progress status of the data processing in a case of performing the data processing in multiple times, and the priority switching control part is configured to calculate the remaining processing time according to a remaining number of processing acquired from the number of times of the data processing performed by the data processor separately and the notified processing completion number, an amount of processing in one data processing performed separately, and a speed of the data processing in the data processor.

4. The memory access device according to claim 1, wherein the data processor is configured to notify a processing completion amount indicating an amount of processing for which the data processing has been completed up to a current time, as the progress status of the data processing, in a case of performing the data processing divided into multiple times with different processing amounts, and the priority switching control part is configured to calculate the remaining processing time, according to an amount of remaining processing acquired from a total amount of processing in the data processing performed by the data processor and the notified processing completion amount, and a speed of the data processing in the data processor.

5. The memory access device according to claim 1, wherein the priority switching control part is configured to calculate the processing margin time after multiplying one or both of the remaining processing time and the limit time by a predetermined time coefficient expressed as a ratio to time.

6. The memory access device according to claim 1, further comprising:

a plurality of the data processors that are configured to sequentially perform a corresponding data processing in a series of processing in a predetermined order, wherein each of the data processors is configured to start a corresponding data processing included in the next series of processing after the corresponding data processing included in the series of processes started first is completed, so that the plurality of data processors perform the corresponding data processing included in different series of processing in parallel, and the priority switching control part is configured to determine the urgency of the data processing by each of the data processors in units of the series of processing, according to the progress status of the data processing notified from each of the data processors, and, when it is determined that the urgency of the data processing in the plurality of data processors is high, to output the priority switching signal notifying to increase the priority of the data processor that performs the corresponding data processing included in the series of processes started earlier.

7. The memory access device according to claim 1, further comprising:

a plurality of the data processors that are configured to sequentially perform a corresponding data processing in a series of processing in a predetermined order, wherein each of the data processors is configured to start the corresponding data processing included in the next series of processing after the corresponding data processing included in the series of processing started earlier is completed, so as to perform the corresponding data processing included in the series of processing in which the plurality of data processors are different from each other in parallel, and the priority switching control part is configured to calculate the processing margin time for each of the data processors, according to the remaining processing time for each of the data processors calculated according to the progress status of the data processing notified from each of the data processors, the limit time set for each of the data processors in each of the series of processes, and the processing time for each of the data processors, to determine the urgency of the data processing for each of the data processors, according to the processing margin time for each of the data processors and the urgency threshold time, and to output the priority switching signal notifying that the priority is increased so that completion of the data processing by the data processor that performs the data processing corresponding to the last of each series of processing does not exceed the set limit time.

8. An image processing device comprising a memory access device that includes:

a data processor configured to output an access request requesting access to a memory connected to a data bus, perform a data processing on data in the accessed memory, and provide notification of a progress status of the data processing;

a priority switching control part configured to determine an urgency of the data processing by the data processor according to the progress status of the data processing notified from the data processor, and output a priority switching signal notifying switching of a priority of the data processor; and a bus arbiter connected to the data bus, configured to change the priority of the data processor according to the priority switching signal to arbitrate the access request output from the data processor, and control access to the memory according to the access request that has been arbitrated, wherein the priority switching control part is configured to calculate a remaining processing time in the data processing performed by the data processor, according to the progress status of the data processing notified from the data processor, to calculate a processing margin time when the data processor performs the data processing, according to the remaining processing time, a limit time defined as a time that the data processor needs to complete the data processing, and a processing time from a start of the data processing by the data processor to the present, and to determine the urgency of the data processing by the data processor, according to the processing margin time and a predetermined urgency threshold time, when the processing margin time is shorter than the predetermined urgency threshold time, to determine that the urgency of the data processing by the data processor is high, and to output the priority switching signal notifying that the priority of the data processor is to be increased, and when the processing margin time is not shorter than the urgency threshold time, to determine that the urgency of the data processing by the data processor is low, and to output the priority switching signal notifying that the priority of the data processor remains low; and the bus arbiter is configured to arbitrate the access request output from the data processor by increasing the priority of the data processor notified to increase the priority by the priority switching signal.

9. An imaging device comprising an image processing device that includes a memory access device, wherein the memory access device includes:

a data processor configured to output an access request requesting access to a memory connected to a data bus, perform a data processing on data in the accessed memory, and provide notification of a progress status of the data processing;

a priority switching control part configured to determine an urgency of the data processing by the data processor according to the progress status of the data processing notified from the data processor, and output a priority switching signal notifying switching of a priority of the data processor; and a bus arbiter connected to the data bus, configured to change the priority of the data processor according to the priority switching signal to arbitrate the access request output from the data processor, and control access to the memory according to the access request that has been arbitrated, wherein the priority switching control part is configured to calculate a remaining processing time in the data processing performed by the data processor, according to the progress status of the data processing notified from the data processor, to calculate a processing margin time when the data processor performs the data processing, according to the remaining processing time, a limit time defined as a time that the data processor needs to complete the data processing, and a processing time from a start of the data processing by the data processor to the present, and to determine the urgency of the data processing by the data processor, according to the processing margin time and a predetermined urgency threshold time, when the processing margin time is shorter than the predetermined urgency threshold time, to determine that the urgency of the data processing by the data processor is high, and to output the priority switching signal notifying that the priority of the data processor is to be increased, and when the processing margin time is not shorter than the urgency threshold time, to determine that the urgency of the data processing by the data processor is low, and to output the priority switching signal notifying that the priority of the data processor remains low; and the bus arbiter is configured to arbitrate the access request output from the data processor by increasing the priority of the data processor notified to increase the priority by the priority switching signal.

* * * * *